(12) United States Patent
Veskovic

(10) Patent No.: US 7,111,952 B2
(45) Date of Patent: Sep. 26, 2006

(54) SYSTEM TO CONTROL DAYLIGHT AND ARTIFICIAL ILLUMINATION AND SUN GLARE IN A SPACE

(75) Inventor: Dragan Veskovic, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/804,881

(22) Filed: Mar. 19, 2004

(65) Prior Publication Data

US 2005/0110416 A1    May 26, 2005

Related U.S. Application Data

(60) Provisional application No. 60/529,996, filed on Dec. 15, 2003, provisional application No. 60/457,276, filed on Mar. 24, 2003.

(51) Int. Cl.
H05B 35/00 (2006.01)
H05B 37/02 (2006.01)
E05F 13/04 (2006.01)

(52) U.S. Cl. .................. 362/1; 362/276; 362/802; 362/458; 160/5

(58) Field of Classification Search .............. 362/1, 362/227, 233, 276, 802, 458; 160/84.02, 160/331, 5; 250/205, 214 AL; 318/480; 49/25; 315/150
See application file for complete search history.

(56) References Cited

U.S. PATENT DOCUMENTS

| | | | |
|---|---|---|---|
| 3,488,505 A | 1/1970 | Jentoft et al. |
| 4,246,477 A | 1/1981 | Latter |
| 4,538,218 A | 8/1985 | Watson |
| 5,191,265 A | 3/1993 | D'Aleo et al. |
| 5,237,168 A | 8/1993 | Giust et al. |
| 5,237,169 A | 8/1993 | Grehant |
| 5,463,286 A | 10/1995 | D'Aleo et al. |
| 5,532,560 A | 7/1996 | Element et al. |
| 5,598,000 A | 1/1997 | Papat |
| 5,701,058 A | 12/1997 | Roth |
| 5,735,328 A | 4/1998 | Salhoff et al. |

(Continued)

Primary Examiner—Sandra O'Shea
Assistant Examiner—Guiyoung Lee
(74) Attorney, Agent, or Firm—Ostrolenk, Faber, Gerb & Soffen, LLP

(57) ABSTRACT

An illumination maintenance system for maintaining a desired illumination profile in a space throughout at least a portion of a day where the illumination sources include daylight and artificial light, the system comprising a first sensor for sensing an illumination level in at least a portion of the space, at least one window treatment for at least one opening for allowing daylight into the space, the window treatment selectively altering the amount of daylight entering the space, a plurality of electric lamps providing artificial light to supplement the daylight illumination of the space; the electric lamps being dimmable, a control system controlling the at least one window treatment and the plurality of electric lamps to maintain the desired illumination profile in the space, the control system controlling the plurality of electric lamps so that the dimming level of each lamp is adjusted to achieve the desired lighting profile and compensate for the daylight illumination in the space throughout at least the portion of the day; and the control system further operating to adjust the window treatment in the event of sun glare through the opening to reduce the sun glare and such that when the desired illumination profile within a defined tolerance is achieved, the control system stops varying the dimming levels of the lamps and the adjustment of the at least one window treatment.

31 Claims, 18 Drawing Sheets

U.S. PATENT DOCUMENTS

| | | |
|---|---|---|
| 5,818,734 A | 10/1998 | Albright |
| 6,064,949 A | 5/2000 | Werner et al. |
| 6,084,231 A | 7/2000 | Popat |
| 6,340,864 B1 | 1/2002 | Wacyk |
| 6,388,404 B1 * | 5/2002 | Schnebly et al. ............. 318/16 |
| 6,583,573 B1 | 6/2003 | Bierman |

* cited by examiner

SYSTEM TO CONTROL DAYLIGHT AND ARTIFICIAL ILLUMINATION AND SUN GLARE IN A SPACE

CROSS REFERENCE TO RELATED APPLICATIONS

This application claims the benefit and priority of U.S. Provisional application Ser. No. 60/457,276 filed Mar. 24, 2003 entitled "Multi-Zone Closed Loop Illumination Maintenance System" and U.S. Provisional application Ser. No. 60/529,996 filed Dec. 15, 2003 entitled "System To Control Daylight and Artificial Illumination and Sun Glare in a Space" and is related to U.S. application Ser. No. 10/660,061 filed Sep. 11, 2003, entitled "MOTORIZED WINDOW SHADE CONTROL" and U.S. Pat. No. 4,236,101 granted Nov. 25, 1980 entitled "Light Control System" the entire disclosures of which are hereby incorporated by reference herein.

BACKGROUND OF THE INVENTION

The present invention relates to a system to provide sufficient and comfortable lighting within a space. In particular, the invention relates to a system for the automatic control of the light levels in a space by the control of the intensity of electric lighting and/or daylight in a space. In particular, in one embodiment, the present invention is directed to the control of the lighting level in a space, such as an interior room, by controlling both the artificial light in the space by control of the intensity of electric lighting in the space and the control of motorized window treatments in the space in order to achieve a reasonably constant illumination on task surfaces throughout the space. In addition, the invention is directed to a system to reduce or prevent sun glare, which can potentially occur at low sun angles due to sunshine through windows or other openings, e.g., skylights, surrounding the space. Such a condition is likely to occur at or near sunset or sunrise.

Further, the invention is directed to the control of electric lighting in a space in multiple zones of the space to achieve a preset lighting profile in the space. A "lighting profile" represents a desired distribution of target illumination values in various portions of the space. Additionally, the invention is directed to the control of window treatments such as shades based on light levels in the interior of the space so as to maintain a predefined illumination profile in the space and/or to minimize or eliminate sun glare through openings into the space. Further, the invention is directed to a system which performs the three functions of controlling electric lighting in the space, controlling natural lighting in the space in order to achieve a predefined illumination profile and minimizing or eliminating sun glare into the pace. The invention is thus directed to an illumination maintenance system for achieving a predefined illumination profile in a space where the light is provided by natural light or artificial light or both and further where sun glare is optionally minimized or eliminated.

One of the major problems of illumination maintenance systems, and in particular, closed loop (feedback) illumination maintenance systems, is the variation of incident light at the sensor or sensors employed for detecting the incident light due to occupants moving in the space or some other type of variation of surface reflections in the space. One of the prior art approaches to solve this problem is to average the illumination readings from multiple light level sensors. Another approach is to position or orient the field of view of the sensors such that the sensors are not influenced by the occupant traffic or other short or long term variations of the optical properties of the environment.

Further, open loop systems have been developed for illumination maintenance and daylight harvesting but such open loop systems are not suitable for window treatment control implemented based on the interior light sensors because when a shading or window treatment device is closed, access to exterior lighting conditions is prevented or restricted.

Currently available commercial solutions for daylight control of window treatments are mostly based on exterior light sensors and predictive control algorithms. Exterior light sensors cause maintenance problems and require exterior wiring. Predictive control schemes are difficult to configure. Usually a long process of measurements and computer or mechanical model simulations must be performed before the control system can be correctly configured.

Further, a conventional approach that attempts to solve the glare problem due to sunshine entering through windows at a low sun angle utilizes some form of open loop control of window treatments. In these systems, the algorithms are usually based on the use of exterior photosensors. These conventional systems employ a combination of strategies based on the exterior light level readings and a time clock in order to derive the required shade positions. A study of the expected lighting conditions is regularly performed in order to predict the times when the glare incidents are likely to occur. Some of the problems with this type of control are that it demands maintenance of exterior photo sensors exposed to the elements and there are problems with wiring and/or mounting sensors continuously exposed to the outside lighting conditions. Furthermore, preparation and creation of complex databases is required to define the lighting conditions for each space of a building throughout a year for large buildings, which is time consuming and expensive. Further, these systems require control database modifications in case exterior shading objects are added such as new buildings or plants and further, the controls cannot be fully optimized for each space of a large building and therefore do not result in optimal occupant comfort and energy savings.

SUMMARY OF THE INVENTION

The present invention provides a new approach to maintenance of illumination in a confined space where the sources of the illumination include combinations of daylight and electric lamps in the space. The space may be divided into illumination zones. The new approach allows for variable and flexible daylight compensation without using separate sensing for each illumination zone and for integrated control of window treatments. One or more sensors can be used to control a plurality of electric lamps in order to reasonably and accurately maintain a desired illumination profile in the space. In addition, a plurality of light sensors can be used to produce a control variable corresponding to the current overall illumination. This approach results in the ability to accurately control local illumination without requiring localized sensing for different parts of the space.

A further advantage of the present invention is that the overall illumination in the space can be maintained for multiple lighting profiles. Each of these lighting profiles can have different requirements for the overall illumination and the relations of illuminations in different portions of the space.

Two exemplary embodiments for the electric light control implementation are described herein, although variations of these embodiments will be apparent to those of skill in the art based on the descriptions contained herein. These embodiments may employ control options defined as "open loop" control and "closed loop" control. The term "open loop" is used to describe an electric light control system based on signals from interior light sensors that predominantly sense daylight entering the space. The term "closed loop" refers to electric light level control systems using interior light sensors which predominantly sense a combination of daylight entering the space and the light generated by the electric light sources being controlled.

The invention also describes a closed loop system for control of window shading devices. It is assumed that such closed loop system is implemented based on the light readings from a light sensor sensing dominantly daylight entering the space through the windows affected by the window treatments being controlled. Therefore the sensor incident illumination changes as a consequence of window treatment adjustment.

Based on one embodiment of the present invention the control of both the plurality of electric lights and window treatments can be achieved using only a single photosensor or a single averaged reading from a plurality of interior sensors. Thus the single signal (single input variable) from a single light sensor or group of light sensors can be used as an input for a closed loop algorithm for control of window treatments and an open loop algorithm for control of electric lights.

As discussed above, one of the problems with prior art systems is that exterior light sensors and predictive control algorithms are employed for control of window treatments. As described above, these systems require maintenance of exterior sensors and complex data gathering and setup procedures. The control approach of the present invention eliminates the need for exterior sensors and these data gathering and setup procedures, thus reducing the overall system cost.

In addition, the present invention also allows sun glare in the interior space to be controlled. The present invention can provide near optimal illumination control of the space. Furthermore, the properties of the space such as the aperture ratios or openings, geometric orientation of the windows or exterior shading objects do not need to be known prior to the installation and commissioning of the system. Both illumination and glare can be controlled without significantly sacrificing energy savings resulting from the use of daylight or interior illumination. The system has the potential to automatically recalibrate based on immediate or repeated occupant input resulting in increased occupant satisfaction.

Another object of the invention is to maximize daylight savings by closing the window treatment only during glare incidents and during times when the sunlight illumination near windows exceeds a preset calibration value.

In this application, it should be understood that "windows" refers to any openings into a space including, e.g., skylights or any other openings. Further, "window treatment" refer to any type of opening shading device, such as blinds, shades, controllable or glazing or any other device whose purpose is to control the amount of light entering or leaving the space through an opening of any kind, whether in a building wall or roof.

According to one aspect, the invention comprises an illumination maintenance system for maintaining a desired illumination profile in a space throughout at least a portion of a day where the illumination sources include daylight and artificial light, the system comprising a sensor for sensing an illumination level in at least a portion of the space, a plurality of electric lamps providing artificial light to supplement the daylight illumination of the space; the electric lamps being dimmable and being arranged in one or more zones in the space, the zones defining predefined volumes of the space, each zone having at least one lamp, a control system controlling the dimming levels of the plurality of electric lamps to maintain the desired illumination profile in the space, the at least one lamp of each zone being controlled to a dimming level to achieve a desired illumination level in the respective zone according to the desired illumination profile, the control system controlling the plurality of electric lamps so that the dimming level of each lamp is adjusted to achieve the desired illumination profile and compensate for the daylight illumination in the space throughout at least the portion of the day, wherein the dimming level of each lamp is selected by the control system from one of a plurality of lighting presets, each preset comprising a combination of dimming levels of the lamps and wherein the control system fades the electric lamps toward a preset that will result in an appropriate supplementing of the daylight illumination to achieve the desired illumination profile in the space; and the control system operating such that, when the desired illumination profile is achieved within a predefined tolerance, the control system stops varying the dimming levels of the lamps.

According to another aspect, the invention comprises an illumination maintenance system for maintaining a desired illumination profile in a space throughout at least a portion of a day where the illumination source comprises daylight entering the space, the system comprising a sensor for sensing an illumination level in at least a portion of the space, at least one electrically controllable window treatment for at least one opening for allowing daylight into the space, the window treatment selectively altering the amount of daylight entering the space through the opening, a control system controlling the at least one window treatment, the control system controlling the at least one window treatment to achieve the desired illumination profile in the space throughout at least the portion of the day, and wherein the control system stops adjusting the at least one window treatment when the desired illumination profile within a predefined tolerance has been achieved.

According to a further aspect, the invention comprises a system for reducing sun glare through an opening into a space, the system comprising at least one electrically controllable window treatment for at least one opening for allowing daylight into the space, the window treatment selectively altering the amount of daylight entering the space through the opening, a sensor for sensing daylight illumination entering the space, a control system controlling the at least one window treatment, and the control system operating to adjust the window treatment in the event of sun glare through the opening to reduce the sun glare, and such that when the sun glare has been minimized, the control system stops the adjustment of the at least one window treatment.

According to yet another aspect, the invention comprises an illumination maintenance system for maintaining a desired illumination profile in a space throughout at least a portion of a day where the illumination source comprises daylight entering the space, the system comprising at least one electrically controllable window treatment for at least one opening for allowing daylight into the space, the window treatment selectively altering the amount of daylight entering the space through the opening, a sensor for sensing daylight illumination entering the space, a control system controlling the at least one window treatment to maintain the desired illumination profile in the space throughout at least the portion of the day, and the control system further operating to adjust the window treatment in the event of sun glare through the opening to reduce the sun glare, and such that when the desired illumination profile within a predefined tolerance is achieved, the control system stops the adjustment of the at least one window treatment.

According to still another aspect, the invention comprises an illumination maintenance system for maintaining a desired illumination profile in a space throughout at least a portion of a day where the illumination sources include daylight and artificial light, the system comprising a first sensor for sensing an illumination level in at least a portion of the space, at least one electrically controllable window treatment for at least one opening for allowing daylight into the space, the window treatment selectively altering the amount of daylight entering the space through the opening, a plurality of electric lamps providing artificial light to supplement the daylight illumination of the space, the electric lamps being dimmable, a control system controlling the at least one window treatment and the plurality of electric lamps to maintain the desired illumination profile in the space, the control system controlling the plurality of electric lamps so that the dimming level of each lamp is adjusted to achieve the desired illumination profile and compensate for the daylight illumination in the space throughout at least the portion of the day, and the control system further operating to adjust the at least one window treatment in the event of sun glare through the opening to reduce the sun glare, and such that when the glare is eliminated or reduced to a satisfactory level and the desired illumination profile within a predefined tolerance is achieved, the control system stops varying the dimming levels of the lamps and the adjustment of the window treatment.

According to a further embodiment of the invention, the illumination maintenance system for an interior space comprises a sensor for sensing illumination in one portion of the space or alternatively for sensing of average illumination in the space, a lighting source to supplement daylight illumination comprising multiple independently controllable dimmable electric lights, and optionally electrically controllable window and/or skylight shading devices to attenuate daylight illumination, for example roller shades, any type of blind or electrically controllable window or skylight glazing.

According to yet another embodiment, the invention comprises an illumination maintenance system for maintaining a desired illumination profile in a space throughout at least a portion of a day where the illumination sources include daylight and artificial light, the system comprising at least one interior sensor for sensing an illumination level in at least a portion of the space; at least one electrically controllable window treatment for at least one opening for allowing daylight into the space, the window treatment selectively altering the amount of daylight entering the space through the opening; a plurality of electric lamps providing artificial light to supplement the daylight illumination of the space, the electric lamps being dimmable; a control system controlling the at least one window treatment and the plurality of electric lamps to maintain the desired illumination profile in the space; the control system controlling the plurality of electric lamps so that the dimming level of each lamp is adjusted to achieve the desired illumination profile and compensate for the daylight illumination in the space throughout at least a portion of the day; wherein the control of the electric lamps is implemented based on an open loop control algorithm and the control of window shading devices is implemented based on a closed loop control algorithm; and wherein the control of both the electric lamps and the window treatments is based on a signal representing a single input variable derived from the at least one interior sensor.

Further, the system comprises an automatic control system operating both the window and/or skylight shading devices and the electric lights in order to maintain a desired illumination profile in the space.

According to a first electric light control method of the invention, the electric lights are controlled using a closed loop algorithm. Preferably, the lighting control system operates the electric lights so that the lights are dimmed between two or more fixed presets or scenes. Each preset comprises a combination of dimming levels to achieve the desired lighting profile and compensate for the daylight availability in the space through the day. The presets are ordered based either on the overall dimming level for each zone or the dimming levels intended for particular portions of the space. The correlation of dimming level of the individual lighting zones for each preset is set in the inverse proportion to the daylight available at a particular position in the space.

The control system automatically adjusts the dimming level of the electric lights towards a preset that would result in the appropriate supplementing of the available daylight. When the desired illumination is achieved, the system stops varying the light output from the electric lights and/or stops varying the position or transparency of the shading devices. The system adjusts a plurality of electric lights between presets corresponding to one or more daytime lighting conditions and a nighttime lighting condition. Both the window shading devices and the electric lights can be controlled using one or more interior photosensors representing a single input to the control system. Alternatively, the window shading devices can be controlled based upon one or more interior photosensors separate from the photosensors used to control the electric lights and connected to a lighting control processor.

The method for control of window treatments described by the present invention can also be combined with an open loop method for control of electric lights. This open loop method for electric light control can preferably be implemented as described in the referenced U.S. Pat. No. 4,236,101, the entire disclosure of which is incorporated by reference herein.

In the case when an independent second photosensor or a set of photosensors are used for the control of the window shading devices, the photo sensors are preferably mounted close to the window such that their field of view is oriented toward the windows such that they dominantly sense the daylight entering the space.

As mentioned, an independent set of photosensors can be used for the control of electric lights. These sensors can be of the same type as the photosensors controlling the window shading device and are in an exemplary embodiment connected to the lighting control system via a separate interface unit. The light level readings from these sensors are processed by an independent control algorithm. The photosensors used for the electric light control are preferably mounted at approximately two window heights away from the windows. In one particular implementation, the sensors are oriented so that their field of view is away from the windows. This orientation is suitable for a closed loop lighting control system. However, dominantly open loop system could also be employed for this purpose. In the case of dominantly open loop control, the field of view of the interior sensors for the electric lighting control is oriented towards the windows.

The invention also comprises methods for illumination maintenance.

According to one aspect, the invention comprises a method for maintaining a desired illumination profile in a space throughout at least a portion of a day where the illumination sources include daylight and artificial light, the method comprising sensing an illumination level in at least a portion of the space, supplementing the daylight illumination of the space with a plurality of electric lamps providing artificial light, the electric lamps being dimmable and being arranged in one or more zones in the space, the zones defining predefined volumes of the space, each zone having at least one lamp, controlling with a control system responsive to the sensed illumination level the dimming levels of the plurality of electric lamps to maintain the desired illumination profile in the space, the step of controlling comprising adjusting the dimming level of the at least one lamp of each zone to achieve a desired illumination level in the respective zone and thereby maintain the desired illumination profile in the space and compensate for the daylight illumination in the space, wherein the dimming level of each lamp is selected by the control system from one of a plurality of lighting presets, each preset comprising a combination of dimming levels of the lamps and wherein the control system fades the electric lamps toward a preset that will result in an appropriate supplementing of the daylight illumination to achieve the desired illumination profile in the space; stopping varying of the dimming levels of the lamps when the desired illumination profile within a predefined tolerance is achieved, and repeating the above steps during the day to maintain the desired illumination profile throughout at least the portion of the day.

According to another aspect the invention comprises a method for maintaining a desired illumination profile in a space throughout at least a portion of a day where the illumination source comprises daylight entering the space, the method comprising, sensing an illumination level in at least a portion of the space, providing at least one electrically controllable window treatment for at least one opening for allowing daylight into the space, the window treatment selectively altering the amount of daylight entering the space through the opening, controlling the at least one window treatment with a control system responsive to the sensed illumination level to achieve the desired illumination profile in the space, stopping adjusting the at least one window treatment with the control system when the desired illumination profile within a predefined tolerance has been achieved, and repeating the above steps during the day to maintain the desired illumination profile throughout at least the portion of the day.

According to yet another aspect, the invention comprises a method for reducing sun glare through an opening into a space, the method comprising, providing at least one electrically controllable window treatment for at least one opening for allowing daylight into the space, the window treatment selectively altering the amount of daylight entering the space through the opening, sensing daylight illumination entering the space, controlling with a control system responsive to the sensed daylight illumination the at least one window treatment, and adjusting with the control system the window treatment in the event of sun glare through the opening to reduce the sun glare, and when the sun glare has been minimized, stopping adjustment of the at least one window treatment.

According to still yet another aspect, the invention comprises a method for maintaining a desired illumination profile in a space throughout at least a portion of a day where the illumination source comprises daylight entering the space, the method comprising, providing at least one electrically controllable window treatment for at least one opening for allowing daylight into the space, the window treatment selectively altering the amount of daylight entering the space through the opening, sensing daylight illumination entering the space, controlling with a control system responsive to the sensed daylight illumination the at least one window treatment to maintain the desired illumination profile in the space throughout at least the portion of the day, and further adjusting with the control system the window treatment in the event of sun glare through the opening to reduce the sun glare, and when the desired illumination profile within a predefined tolerance is achieved, stopping adjustment of the at least one window treatment, further comprising repeating the above steps during the day to maintain the desired illumination profile throughout at least the portion of the day.

Yet another aspect of the invention comprises a method for maintaining a desired illumination profile in a space throughout at least a portion of a day where the illumination sources include daylight and artificial light, the method comprising, sensing an illumination level in at least a portion of the space, providing at least one electrically controllable window treatment for at least one opening for allowing daylight into the space, the window treatment selectively altering the amount of daylight entering the space through the opening, supplementing the daylight illumination of the space with a plurality of electric lamps providing artificial light, the electric lamps being dimmable, controlling with a control system responsive to the sensed illumination level the at least one window treatment and the plurality of electric lamps to maintain the desired illumination profile in the space, controlling with the control system the plurality of electric lamps so that the dimming level of each lamp is adjusted to achieve the desired illumination profile and compensate for the daylight illumination in the space throughout at least the portion of the day, further adjusting with the control system the at least one window treatment in the event of sun glare through the opening to reduce the sun glare, stopping varying of the dimming levels of the lamps and the adjustment of the window treatment when the desired illumination profile within a predefined tolerance is achieved, and repeating the above steps during the day to maintain the desired illumination profile throughout at least the portion of the day.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIG. 13, comprising

DETAILED DESCRIPTION OF THE INVENTION

Figure 1:
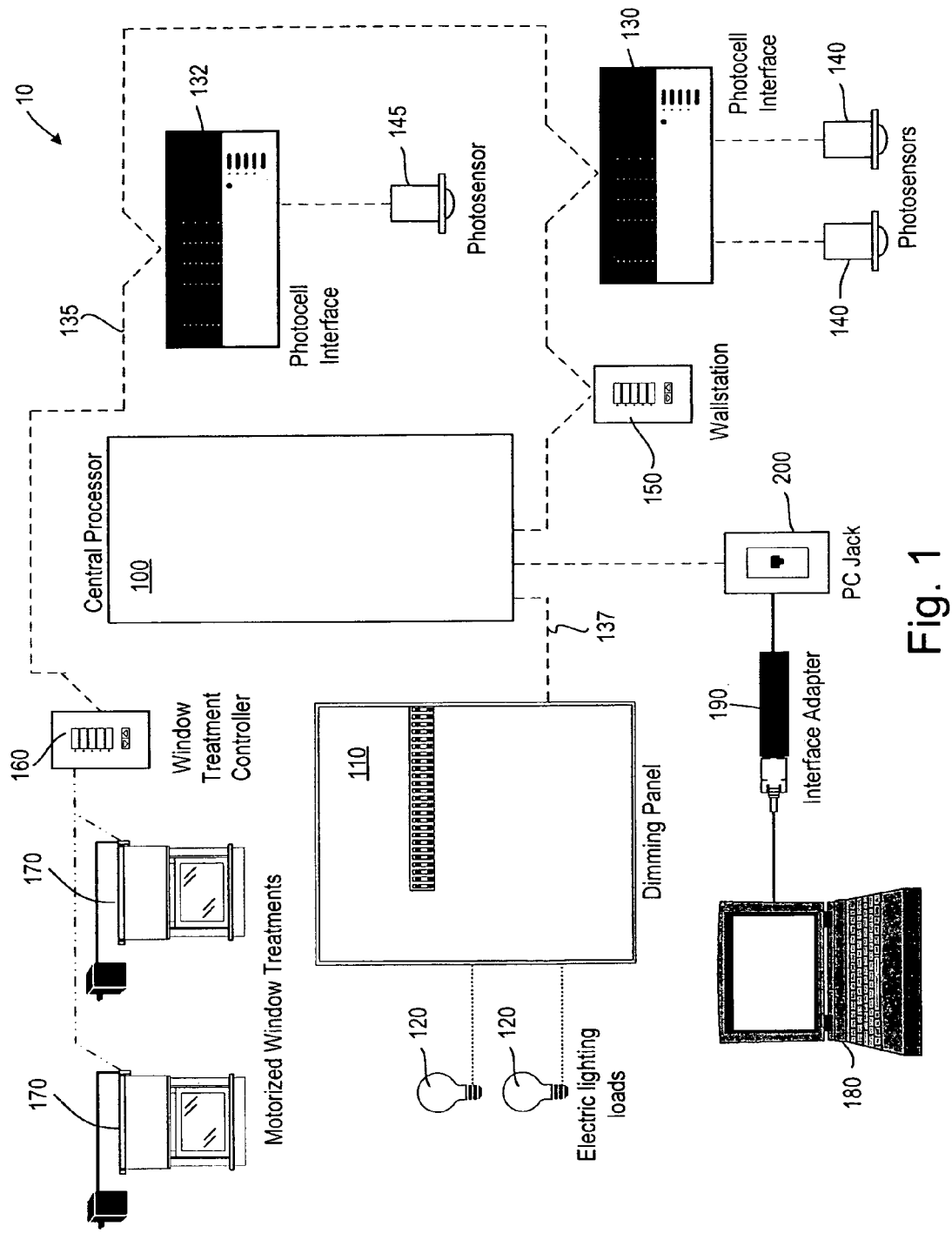
FIG. 1 is a block diagram of a lighting maintenance system according to the invention.

With reference now to the drawings, FIG. 1 is a block diagram of an embodiment of the invention for controlling the illumination levels in a space such as a room, where both daylight and artificial lighting act as light sources, as well as for reducing sun glare. The system 10 comprises a central processor 100 which may be a Lutron GRAFIK 6000® central lighting processor, for example, Model No. GR6MXINP. The central processor 100 has coupled thereto a dimming panel 110 which has various lighting loads 120 which can be any light source type including but not limited to incandescent, fluorescent, HID (High Intensity Discharge), neon, LED (Light Emitting Diode), LV (Low Voltage) coupled thereto and which are controlled by the dimming panel 110 in response to commands from the central processor 100 communicated via a digital communication link 137. The dimming panel may be a Lutron type GP12-1203ML-15. Photosensor interface 130 is coupled to the central processor via a digital communication link 135. Coupled to the photosensor interface 130 are one or more photosensors 140 which may be microWATT® photosensors available from Lutron model No. MW-PS-WH. Photosensors 140 are for control of the interior lights 120. A further photosensor interface 132 is coupled to the central processor 100 via the link 135. Coupled to the photosensor interface 132 are one or more photosensors 145 which may be microWATT photosensors available from Lutron model No. MW-PS-WH. Photosensors 145 are for control of the motorized window treatments 170.

One or more wall stations 150 may be provided which are coupled to the central processor 100 as well as the photosensor interfaces via the digital communication link 135. These wall stations 150 are provided for manual control of the various lighting loads 120. Also connected to the link 135 may be a window treatment controller 160 for manually controlling the window treatments 170. This controller 160 may be a Lutron GRAFIK 6000 Sivoia® controller model No. SO-SVCI-WH-EO1. Window treatments 170 may comprise Lutron Sivoia motor drive units, e.g., model No. SV-MDU-20 or Lutron Sivoia QED™ electronic drive units, e.g. model No. SVQ-EDU-20 driving Lutron Sivoia roller shades, Kit no. SV-RS-KIT.

A computer, for example a personal computer 180 may be coupled to the central processor 100 via an interface adapter 190 and suitable connections such as a PC jack 200 for programming/monitoring of the central processor. Note that a Lutron GRAFIK 7000™ central lighting processor could be used in place of the GRAFIK 6000 central processor.

Figure 2:
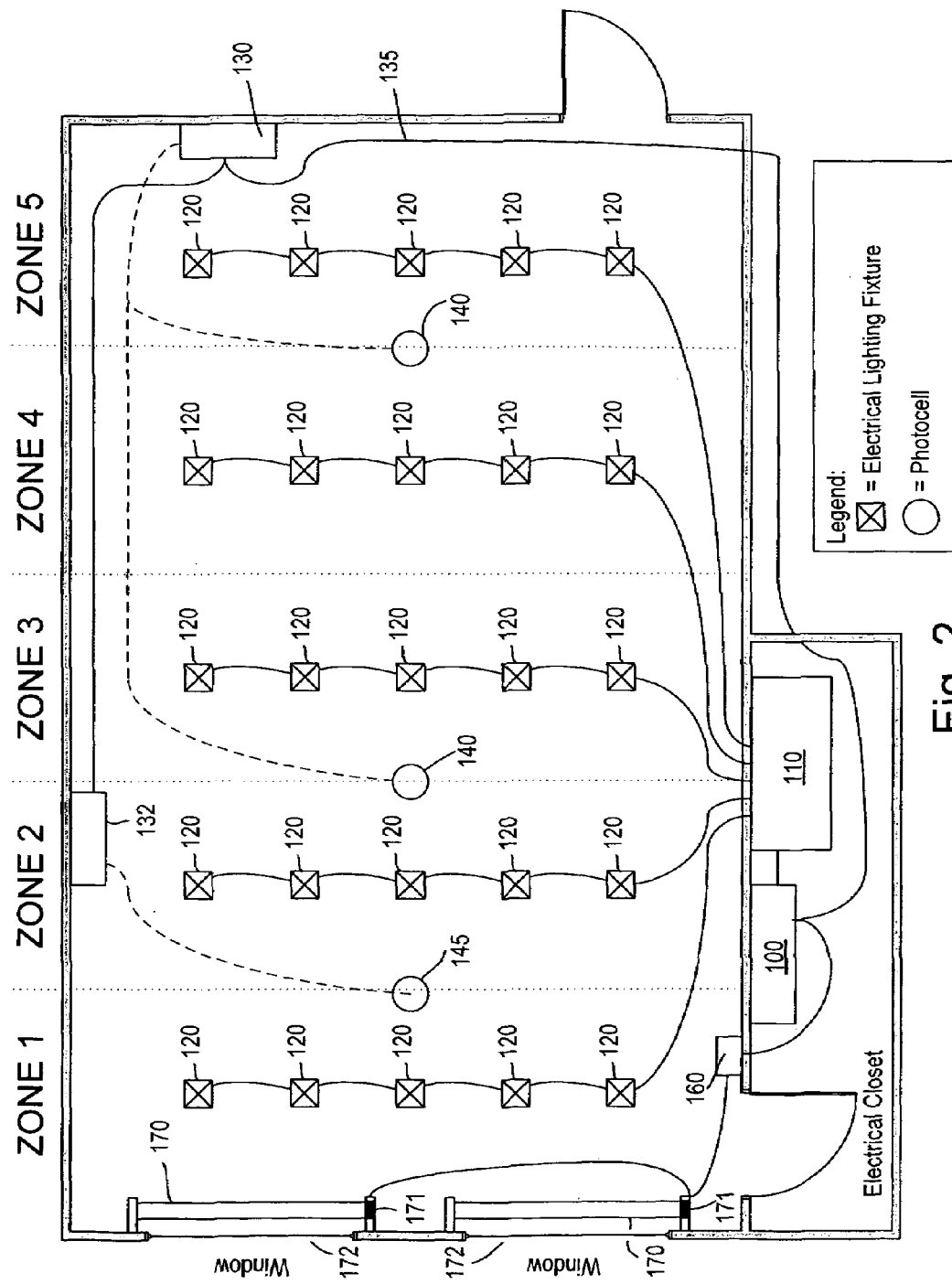
FIG. 2 shows the floor plan of a typical room layout with the system of the invention connected to the various sensors, lighting sources and controllable window treatments.

FIG. 2 shows a floor plan of a typical room layout. The central processor 100 and dimming panel 110 are shown located in an electrical closet. The various lamps 120 are also shown and are grouped into, for example, five zones, each zone controlled separately by the dimming panel. Zone 1 is closest to the windows 172. A different number of zones can be employed, including a single zone. The photosensor interface 130 is coupled to the photosensors 140 and the interface 130 is connected to the central processor 100. Photosensors 140 are preferably mounted such that there is no or minimal daylight shining directly into the photosensor and so that the photosensor measures the light reflected off the surfaces in the illuminated space. Photosensors 140 are preferably mounted at approximately two window heights away from the windows 172. The window treatment controller 160 is coupled to the motorized window treatment motors 171 driving the window treatments 170. The window treatment controller 160, allows manual control of the window treatments 170. The Photosensor interface 132 is coupled to a photosensor or photosensors 145 for sensing daylight entering the room and is connected to the central processor 100. Photosensors 145 are directed so that their field of view is toward the window and are preferably mounted within one window height of the windows 172.

The central processor 100 manages the lighting for an entire facility and allows the user to create and recall custom preset scenes (or presets) for common room activities, for example, general meetings, audio-video presentations, special events, etc. Scenes are set by adjusting the intensity of each zone of electric lights or motorized window treatments to generate a combination for the particular activity. Wall stations 150, hand held controls, preprogrammed time clock events, occupancy sensors, and photosensors 140, 145 can supply inputs to the system to select any scene in any area. The central processor 100 includes an astronomical time clock, which is capable of scheduling events based on sunrise and sunset times. System design and setup are accomplished using, e.g. Lutron GRAFIK 6000 setup software on a personal computer 180. When system setup is complete, the computer 180 may be used for system monitoring and real time operation. One standard central processor 100 can control up to 512 zones and 544 scenes with up to 96 control points.

The motorized window treatments 170 allow the system to control natural light in addition to electric light. The motors 171 can be programmed to preset window treatment levels. The controller 160 allows for selection of the window treatment presets from the central processor 100. Up to 64 motors can be controlled for each controller 160.

The photosensor interface 130 is used for selection of preset lighting scenes and the interface 132 is used to set window treatment levels in response to available daylight or electric light for optimum light levels, energy savings, and reduced sun glare. The photosensor interfaces 130, 132 process the light level information from photosensors 140, 145 and transmit this measured illumination data to the central processor 100 via the digital communication link 135.

In a preferred implementation of the invention, the central processor 100 runs two algorithms: 1) a first algorithm for the control of the window treatments and the second algorithm for control of the electrical lights both based on the readings of photosensors 140 communicated to the central processor 100 through photosensor interface 130. Alternatively the first algorithm for control of window treatments can be implemented based on the readings of photosensors 145 communicated to the central processor through photosensor interface 132. Yet another alternative approach is to base the operation of both control algorithms on the readings from photosensor 145 via interface 132. In this case the control of the electric lights would be based on pre-existing control algorithms as described in U.S. Pat. No. 4,236,101 and implemented in Lutron daylight compensation products such as Micro Watt, Digital Micro Watt and Radio Touch.

In the preferred implementation described, the two algorithms are operated by the same processor. Alternatively, the two algorithms could work independently and be controlled by separate processors or the same processor, but operating independently. For example, one system could be provided to adjust only the shading and to reduce glare in the space. A separate system could be employed only to adjust electrical light levels. Alternatively, one system can handle all three functions, electric light control, shade control to maintain an illumination profile and shade control to minimize sun glare.

In order to control the electric lights according to the first aspect of the invention the implementation is based on a fixed number of presets, or lighting scenes, preferably four presets may be used. However, any number of presets can be provided, including only one. Each preset defines a target intensity for one or more electric lighting zones, for example, zones 1–5 shown in FIG. 2. For a system with four resets, these presets will be referred to as Minimum Preset, Medium Low Preset, Medium High Preset and Maximum Preset.

In most cases, the Minimum Preset is configured so that all electric lights are turned off and is used to maximize daylight in the space. For spaces where daylight contribution deeper in the space is inadequate the minimum preset is configured to maintain adequate illumination under conditions of high daylight availability and with the window treatments fully open. This preset is preferably calibrated when there is adequate daylight availability in the majority of the space being controlled.

The Medium Low preset normally corresponds to the required contribution of electric lights to the overall illumination when enough daylight is available to achieve the highest required illumination in the space in close proximity to the windows or other openings.

The Medium High preset corresponds to the required contribution of electric lights when the available daylight is between the maximum and minimum amounts.

The Maximum Preset corresponds to the required illumination in the space by electric lights only with no daylight available.

The above is one possible way of programming the Minimum, Medium Low, Medium High and Maximum presets, but other values for these presets could be used.

Figure 3:
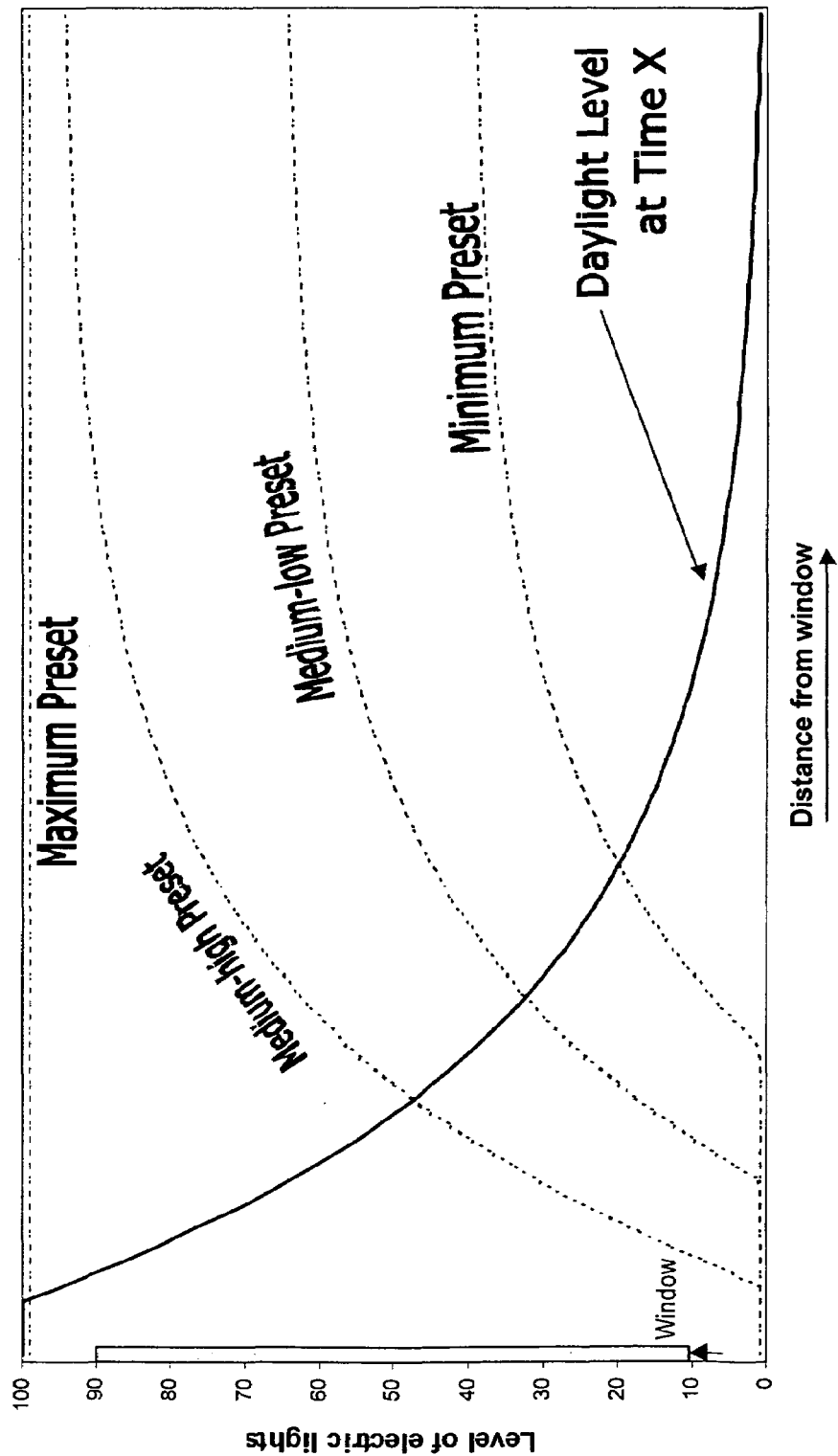
FIG. 3 is a diagram showing a first example of a preset configuration for a flat lighting profile.
Figure 4:
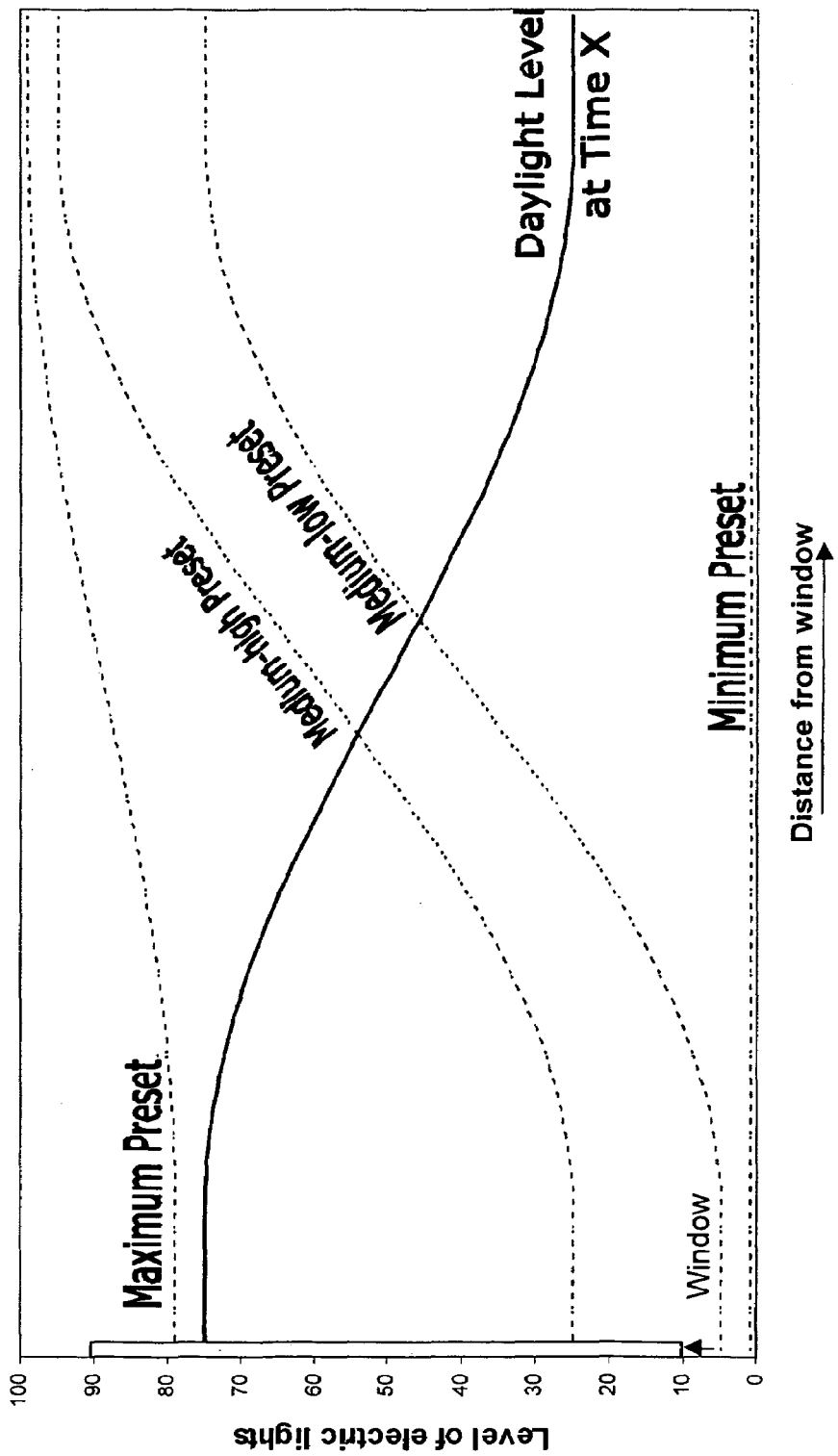
FIG. 4 shows a second example of a preset configuration for a different lighting profile.
Figure 5:
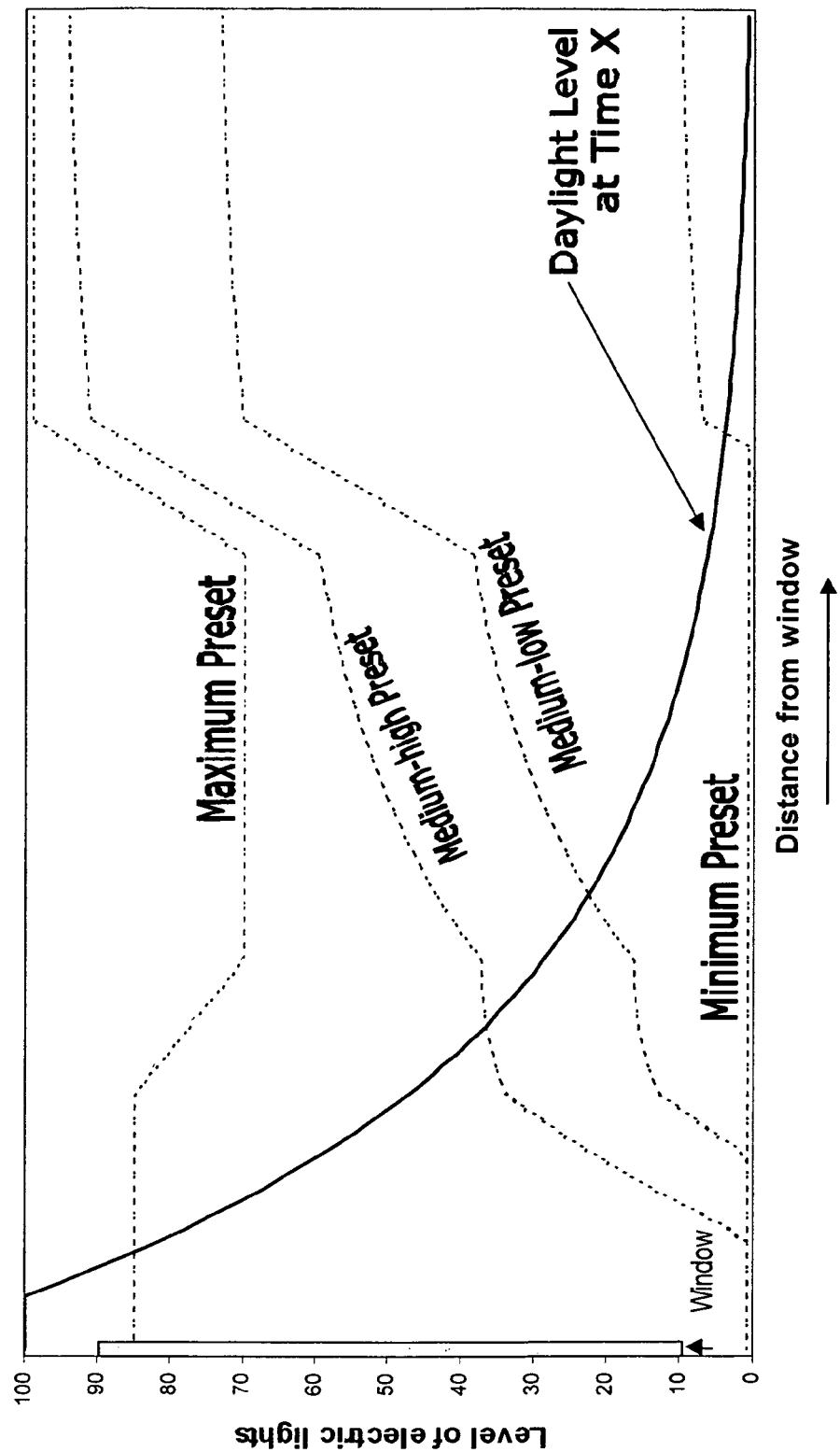
FIG. 5 shows a third example of a preset configuration for yet a different lighting profile.

Various preset or scene configurations are shown in FIGS. 3, 4, and 5. Each chart shows the electric light and daylight levels versus distance from the window. The dashed lines represent the level of the electric lights, which typically get higher farther from the window. The solid line represents the level of daylight coming in through the window at an instantaneous time in the day, which typically decreases with distance from the window. FIG. 3 is an example of a preset configuration for a flat lighting profile in which the Maximum Preset has all zones at maximum intensity (constant light level is desired across the space). The zones intensities for Medium High and Medium Low presets vary depending on distance from the window, so that zones farthest from the window have their lamps set brighter. FIGS. 4 and 5 show preset configurations, in which the presets have different graph shapes for different lighting profiles.

Average illumination contribution for each of the four presets must provide progressively higher overall illumination as detected by photosensors 140 installed in the space. Light level information from one or more photosensors 140 is processed by photosensor interface 130, transmitted to central processor 100, and compared to two thresholds. These thresholds correspond to:

1. The minimum of the acceptable range of illumination; and
2. Target value for the illumination; and
3. The maximum of the acceptable range of illumination.

A light level signal comparator for comparing the light level to the thresholds is preferably of a hysteretic type and can be implemented either as a digital or an analog component. Alternatively, the comparator function can be implemented as part of the central processor 100. Preferably this comparator should be configurable so that a number of different lighting threshold groups can be selected based on a configuration input.

The resulting information will correspond to the following lighting conditions:

1. Illumination in the area is too dark (below minimum threshold); and
2. Illumination in the area is acceptable (above minimum and below maximum threshold);
3. Illumination in the area is too bright (above maximum threshold).

Based on this information, the central processor 100 controls one or more electric lighting zones to achieve the desired illumination profile. Further, as will be described in more detail below, the system preferably will control the window shading devices to prevent sun glare based on input from the photosensors 145.

As discussed above, in the exemplary embodiment there are four presets, Minimum, Medium Low, Medium High and Maximum. The following paragraphs describe the steps taken to configure these four presets.

The calibration of the presets is performed with the control algorithms in the processor 100 disabled and the system is under manual control only. The Minimum Preset is configured by setting the electric light levels when a high level of daylight illumination is available dominantly exceeding the desired target illumination in the space. Lighting zone intensities for the zones closer to the windows are set to off for the Minimum Preset.

The Medium Low Preset is configured as follows: The central processor 100 is disabled and set to a manual control. With the electric lights off, the window treatment positions are selected such that the daylight illumination in the area around the middle of the room or under the second row of lights for deeper spaces is at the target level. Thereafter, the levels of all electric light zones are set such that the light level in the entire area is acceptable. This configuration is the Medium Low Preset.

To configure the Medium High Preset, the central processor 100 is disabled and set to manual control. Medium High Preset in conjunction with the Medium Low Preset defines a region of linear electric light response to daylight availability. This preset is adjusted such that a fixed increase of lighting intensity is added to all of the zone intensities as calibrated for the Medium Low Preset in such a way that no zone intensity exceeds the settings for the night time zone as calibrated in the next step. To simplify calibration the Maximum preset can be calibrated first.

The Maximum Preset is configured by first disabling the control system by setting it to manual control. If blackout window treatments are installed, the window treatments are closed fully, otherwise it is preferable to wait until evening when there is no daylight to set the maximum preset. The levels of all zones are set such that the light level of the entire area will be acceptable with no daylight through the window (nighttime level). This will define the Maximum Preset.

Figure 6:
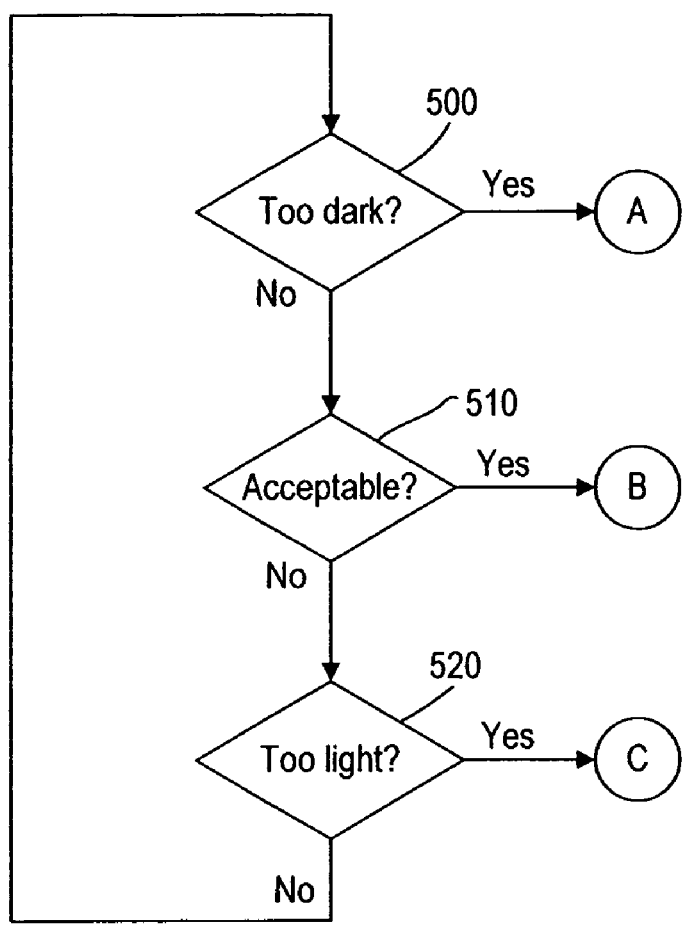
FIG. 6 shows a process flow of the system main loop.
Figure 7A:
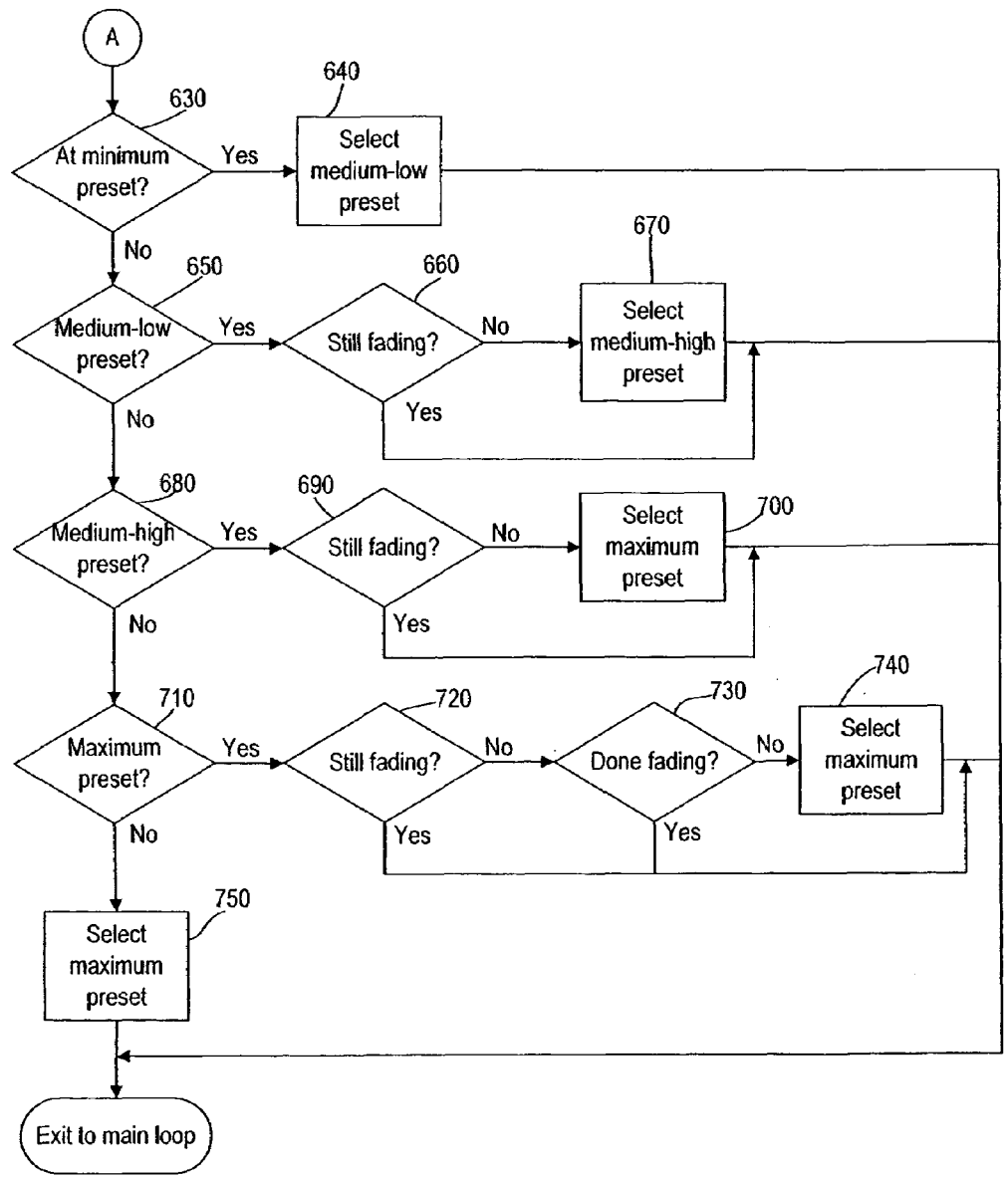
FIG. 7a shows the process flow for a first system controlling the electric lamps only, when the lighting in the space is too dark.
Figure 7B:
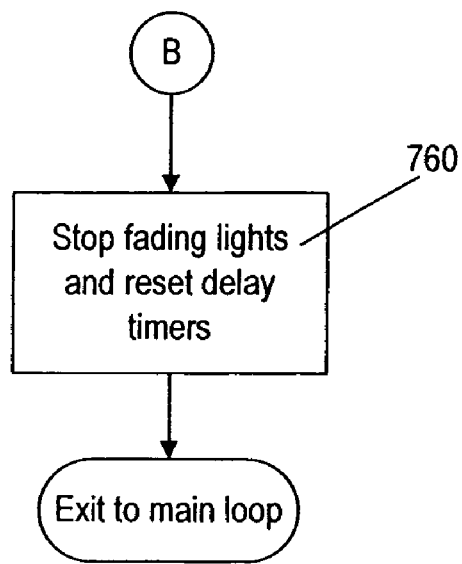
FIG. 7b shows the process flow for the first system controlling the electric lamps only, when the lighting in the space is acceptable.
Figure 7C:
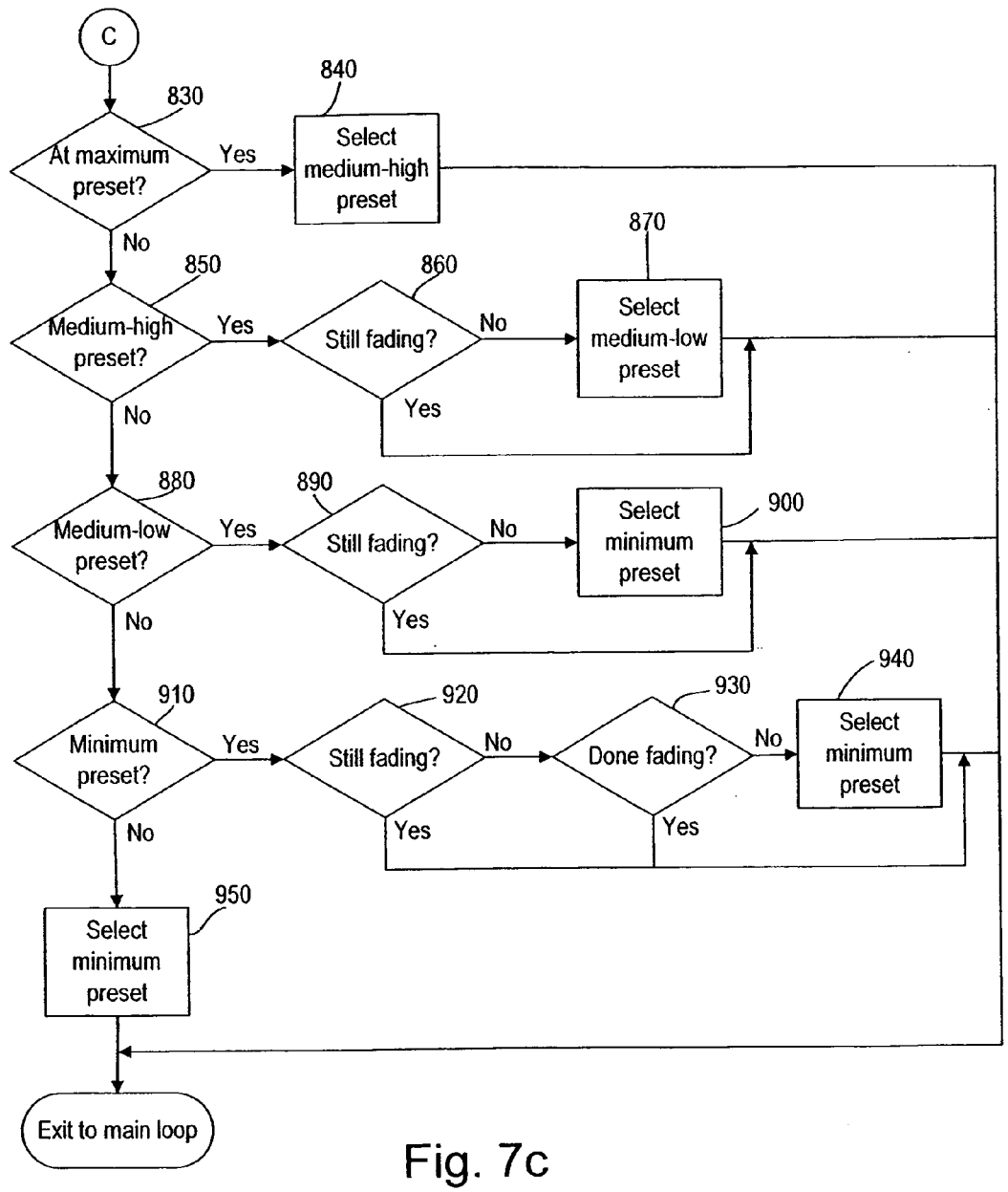
FIG. 7c shows the process flow for the first system controlling the electric lamps only, when the lighting conditions in the interior space are that there is too much light.
Figure 8A:
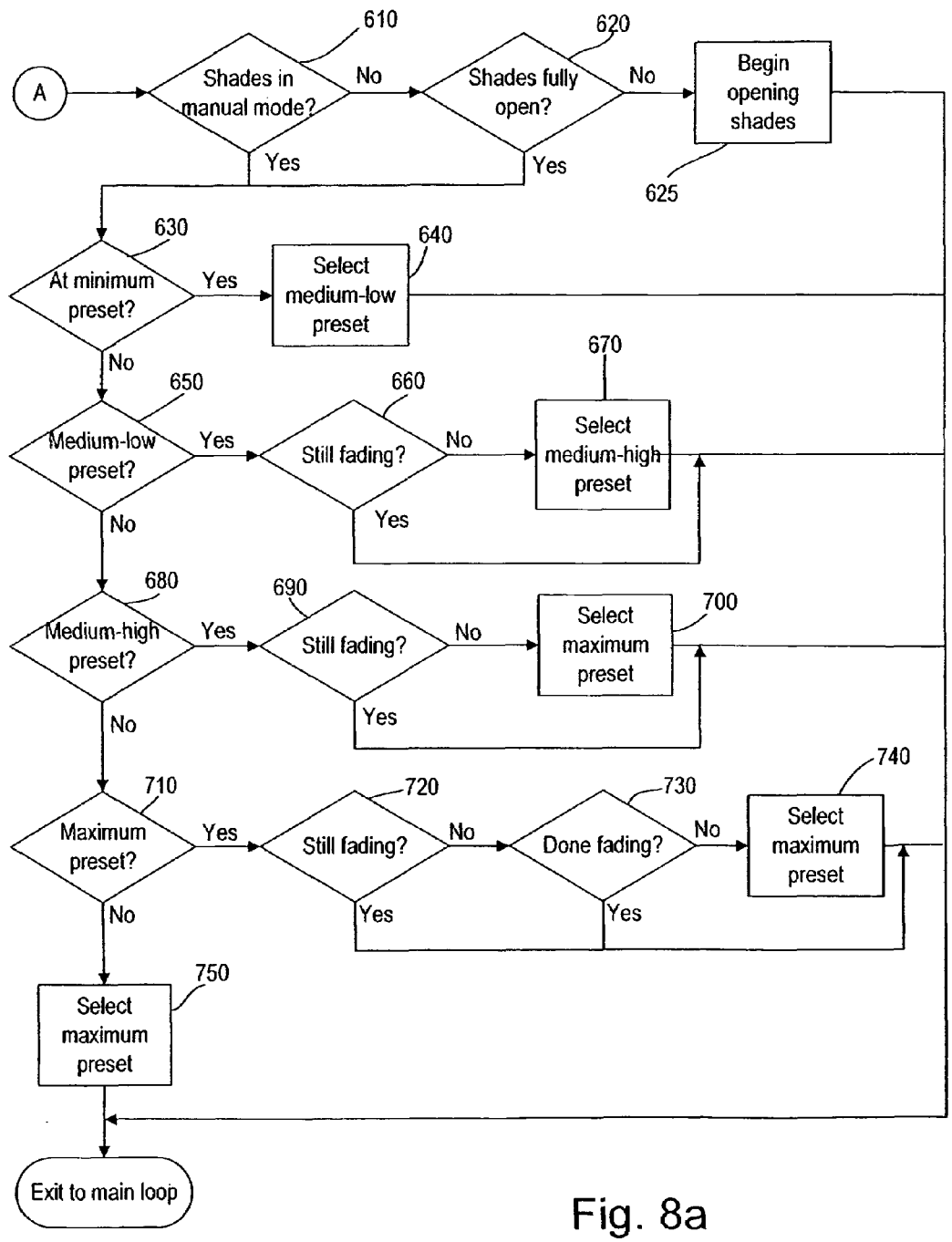
FIG. 8a show the process flow for a second system controlling both electric lamps and window treatments, when the lighting is too dark.
Figure 8B:
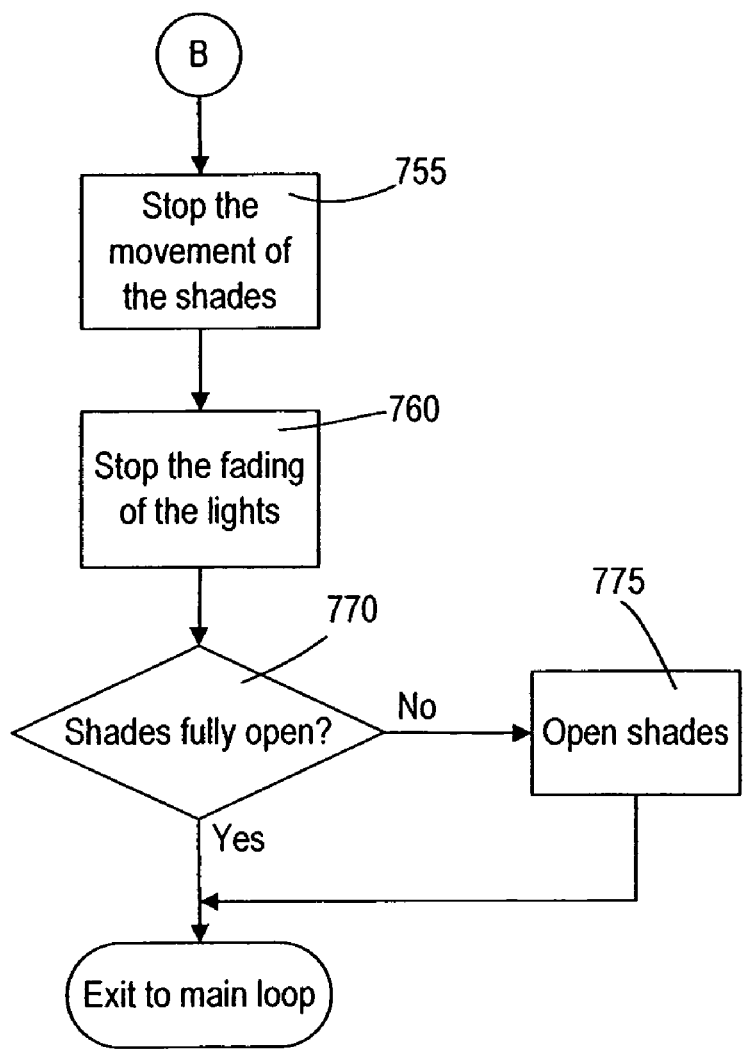
FIG. 8b shows the process flow for the second system when the lighting is acceptable.
Figure 8C:
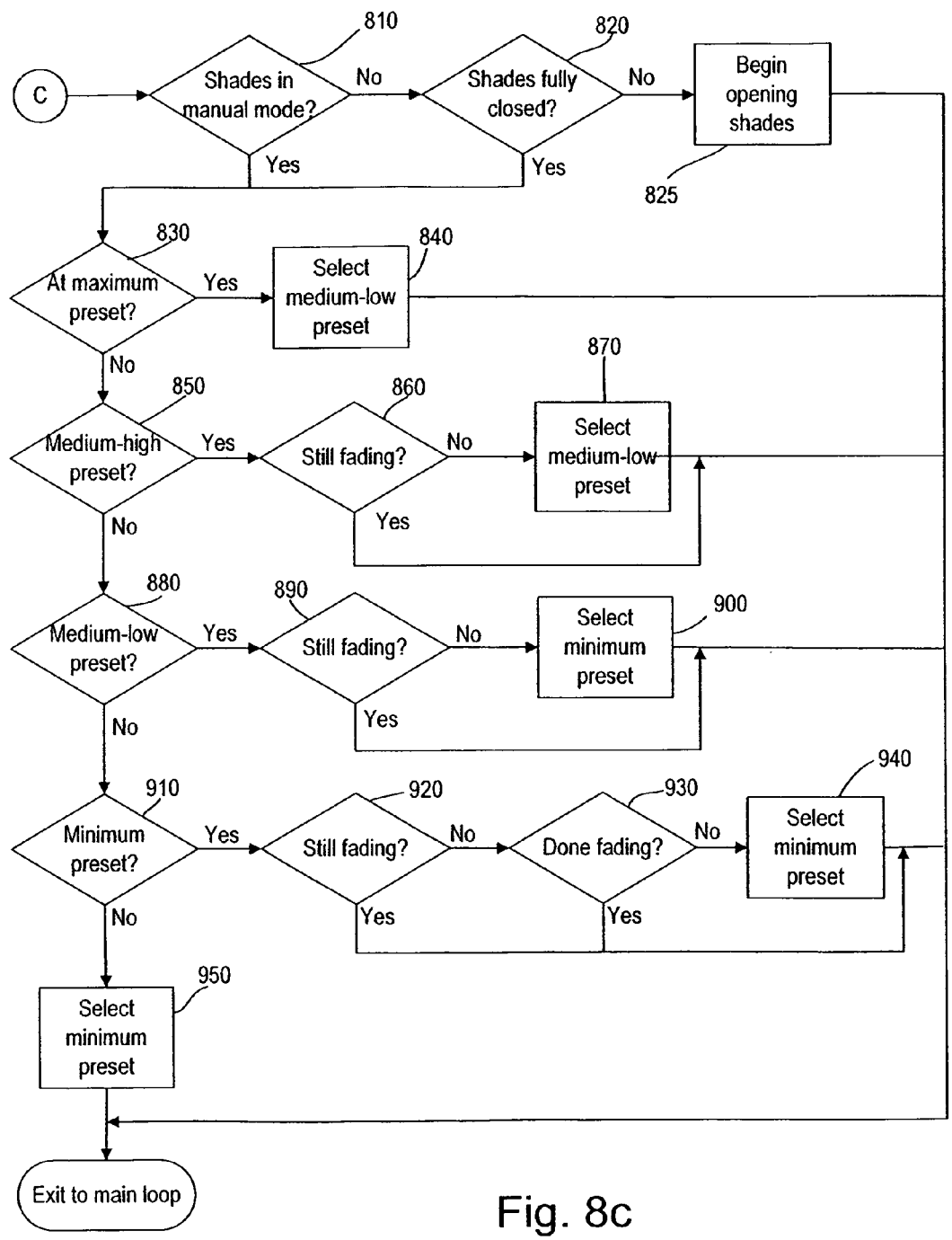
FIG. 8c show the process flow for the second system when there is too much light.

FIG. 6 shows a preferred implementation for the main loop process flow for a system according to the invention based on the closed loop control method for control of electric lights. The main loop will be substantially the same for a system that controls only the electric lamps as it will be for a system that controls both lamps and window treatments. FIGS. 7a, 7b and 7c describe the process flow for a system controlling only the electric lamps. FIGS. 8a, 8b and 8c describe the process flow for a system controlling both the electric lamps and the window treatment devices to achieve a desired illumination profile. FIGS. 9–14 explain the process flow for a system that seeks to reduce or eliminate sun glare. The various loops shown in FIGS. 6–8c as well as FIGS. 10–12 run continuously or at regular intervals.

FIG. 6 shows the flow chart for the main control loop with the three conditions shown: too dark 500, acceptable 510, and too light 520. If it is too dark (500), flow is into FIG. 7a beginning at A. If the level is acceptable (510), the flow is to FIG. 7b at B and if there is too much light (520), the flow is to FIG. 7c at C. For each decision in FIG. 6, the light level as sensed by photosensors 140 is compared to one of the two thresholds previously described.

FIG. 7a shows the flowchart for the too dark condition (500). In more detail, the controller first checks at 630 to determine if the system is set at the Minimum Preset. If yes, the Medium Low Preset is selected at 640. If not, a check is made to determine if the system is set to the Medium Low Preset (650). If yes, a check is made to determine if the electric lights are being faded (660), that is, still in the process of reaching the particular preset level. If yes, an exit is made back to the main loop (FIG. 6). If fading (dimming level change) has been completed, the Medium High Preset is selected (670).

If the Medium Low Preset was not set at step 680, the system checks for whether it is set to the Medium High Preset. Fading is checked at 690, and if fading is completed, the Maximum Preset is selected at 700.

If the system is not set at the Medium High Preset (680), a check is made to determine if it is at the Maximum Preset (710), still fading (720), done fading (730), and the Maximum Preset is selected at 740 and then an exit is made. If the system was not at Maximum Preset at step 710, the Maximum Preset is set at 750 and an exit is made. Thus, if the Maximum Preset was determined to be the system status at step 710, and if fading of the lighting at 720, 730 to the Maximum Preset does not result in the desired illumination, the maximum preset is set at 740. If the system status at step 710 was that the Maximum Preset (nor any of the other three presets) was selected, the system selects the maximum preset at step 750. Thus, if selecting and fading to any of the four presets does not result in the desired illumination profile, the Maximum Preset is automatically selected at 750, as this is the maximum artificial lighting illumination that can be achieved.

FIG. 7b shows the flowchart for the acceptable lighting condition. As shown, if the illumination is in the acceptable range (as detected by each Photosensor 140—the measurements of the photosensors 140 can be averaged or the thresholds for each photosensor can be different), the fading is stopped and delay times reset (760) and return is made to the main loop.

FIG. 7c shows the flowchart for the too light condition.

At 830, a determination is made if the system is at the Maximum Preset. If yes, the Medium High Preset is selected at 840 and an exit is made.

If the Maximum Preset was not set at 830, a check is made to determine if the system has been set at the Medium High Preset at 850. If so, a check is made to determine if the lights are still fading at 860. If not, the Medium Low Preset is selected at 870. If the lights are still fading, an exit is made. Once the Medium Low Preset is set, an exit is made.

If at step 850 the Medium High Preset was not set, a check is made to determine if the Medium Low Preset is set at 880. If so, a check is made at 890 to determine if the lights are still fading. If yes, an exit is made. If not, the Minimum Preset is selected at 900 and an exit is made.

If at step 880 the Medium Low Preset was not set, a check is made at 910 to determine if the system is set to the Minimum Preset. If yes, a check is made at 920 to determine if the lights are still fading. If yes, an exit is made, if not a check is made at 930 to determine if fading is complete. If yes, an exit is made. If not the Minimum Preset is selected at 940 and an exit is made.

Finally, the Minimum Preset is selected at 950 if an acceptable lighting condition was not determined by the main loop (FIG. 6) at any other point during the steps shown in FIG. 7c.

Thus, the system operates by constantly operating in a main loop (FIG. 6), leaving the main loop, depending on whether the lighting condition is too dark or too light (FIGS. 7a and 7c), constantly alternating between the main loop and the loops of FIGS. 7a and 7c while cycling through the loops of FIGS. 7a and 7c, and once an acceptable lighting condition is realized during the main loop at 510, stopping fading at step 760 (FIG. 7b). Should an acceptable lighting condition not be realized, the system defaults to the Minimum or Maximum preset, depending on whether the condition was too much light or too dark, respectively.

In order to compensate for the difference in the spectral sensitivity of the photosensors 140 for different types of light sources, the set point thresholds for the electric light control process flow are preferably varied. Due to the narrow frequency spectrum of the light produced by fluorescent lamps, even sensors designed with human eye corrected spectral sensitivity such as the Lutron MW-PS photosensors deliver a lower output signal for fluorescent lighting compared to that produced in the presence of equivalent daylight.

The set points for the electric light control process flow are adjusted based on the output control signal. Based on experimental measurements, the MW-PS photosensors feature around 30% lower sensitivity to fluorescent lighting compared to daylight. This difference does not present a problem in the usual open loop applications but must be corrected in closed loop applications. The sensitivity compensation is implemented such that the set point is proportionally scaled between 0% and −30% when the control signal for the electric lights near the windows changes from 100% to 0%.

One possible implementation of this set point formula is as follows:

Light Set point=Daytime Set point×(1−0.003×Window Lighting Zone Intensity in %). The constant 0.003 is derived from the known fact that the MW-PS Photosensor has 30% lower sensitivity to fluorescent lighting.

The set point can also be adjusted based on the time of day. Since the window treatments are automatically controlled, the overall variation of the daylight availability in the space during the day is significantly reduced. Therefore, the spectral sensitivity compensation will only effectively be required near sunset and sunrise and can be derived based on the sun angle for a given astronomic time clock reading. An astronomic time clock is contained within the central processor 100.

One example of the alternative method of implementing the selection of the "too dark" and "too light" thresholds is to transmit the current time of day or the Window Lighting Zone Intensity from the central processor 100 to the photosensor interface 130. The photosensor interface 130 can then make any appropriate adjustments to the set point, process the light level information from the photosensors 140, compare the light level information to the set point, and transmit a signal to the central processor 100 corresponding to the current light condition, either "too dark" or "too light". The central processor 100 can then act accordingly to either of these conditions.

The process flow for setting the electric light source levels has thus been described. A further process flow for controlling the window treatments in conjunction with the electric lights will now be described.

Turning to FIG. 8*a*, it is substantially the same as FIG. 7*a*, with the exception that an additional set of conditions is checked at steps 610 and 620. In particular, at step 610, a check is made to determine if the window treatments, for example, shades, are in the manual mode, that is overridden by manual control via wallstation 150 or window treatment controller 160. If yes, the manually set position is not changed and the process goes to step 630, previously described. The remainder of the process has already been described with reference to FIG. 7*a*, and will not be repeated here. Thus, the system attempts to achieve the desired illumination profile leaving the window treatments as manually set.

If the shades are no longer in manual mode, the step 620 is performed and a check is made to determine if the shades are fully open. If yes, the process flows again to step 630, and the system attempts to achieve the desired illumination profile so as to maximize daylight (the shades are left in the open position) and minimize electrical energy usage.

If the shades are not fully open, the system begins to open them at 625, exits to the main loop and returns to the flow of FIG. 8*a* as many cycles as necessary until the shades are fully opened, as determined at step 620, in which case the process flow is to step 630, where the electric lamps are then controlled.

FIG. 8*b* is similar to FIG. 7*b*, but shows that in a system controlling window treatments and lamps, when the lighting is acceptable, the adjustment of the window treatment is stopped (755), the fading of lights is stopped (760), and the shades are fully opened (770, 775), maximizing the amount of daylight in the space and minimizing electric power usage. In another embodiment, it may be desirable, using a time clock, to either fully close or fully open the window treatments after dusk since there is no daylight and to address other concerns such as but not limited to privacy, aesthetic appearance of the building or nighttime light pollution.

FIG. 8*c* corresponds to FIG. 7*c*, except it shows the process flow for a system controlling lights and window treatments. Similarly to FIG. 8*a*, a check is made to determine if the shades are in manual mode at 810, fully closed at 820 (because there is too much light, as opposed to too much darkness) and begins closing the shades at 825. The remainder of the flow chart is similar to FIG. 8*c* and need not be discussed in detail again here.

There has thus been described a first system (FIGS. 6 to 7*c*) for controlling only the electric lights, based on whatever daylight is present, without adjusting window treatments and a second system controlling both lights and window treatments (FIGS. 6, 8*a* to 8*c*). A system to control only the window treatments, based on the flow of FIGS. 6, 8*a* to 8*c*, could also be provided. In such a system, the system would control the window treatments based on the available daylight.

Yet a further process flow of the preferred implementation describes an alternative control algorithm which, in addition to controlling diffused daylight illumination near windows, also controls the window treatments to minimize or eliminate sun glare based on the readings of photosensors 145 through photosensor interface 132.

In order to prevent glare when the sun is at a low angle, for example, near sunset or sunrise, the system of the invention automatically controls the window treatments 170 to prevent glare. In an exemplary embodiment, for aesthetic reasons, the window treatments 170 are preferably controlled in such a way that only a set number of fixed stationary window treatment positions or presets is allowed. For example, the window treatments 170 may move between 4 to 5 fixed window treatment presets including fully opened and fully closed. The control is implemented in the form of closed loop control with a dead-band. This control is not, however, limited to a discrete control. The control could be continuous, as previously described, or it could have more or fewer than 4 to 5 window treatment presets.

The term "dead-band" is used to describe a range of photosensor 145 incident light level readings, which are considered by the system as acceptable and for which no action is performed other than to reset the window treatment delay timers. This will be described below.

The system will only change the window treatment settings when the incident light level on photosensors 145 is outside of the dead-band. In order to reduce the frequency of window treatment movements, all commands are delayed. Therefore, if the particular lighting condition is only temporary, no action will take place. However, glare control is a desirable capability of the system. Therefore, the system should respond quickly when a severe glare condition exists. Longer delays can be permitted when insufficient light is available because the electric lights in the space can compensate for the temporary low daylight availability.

Figure 9:
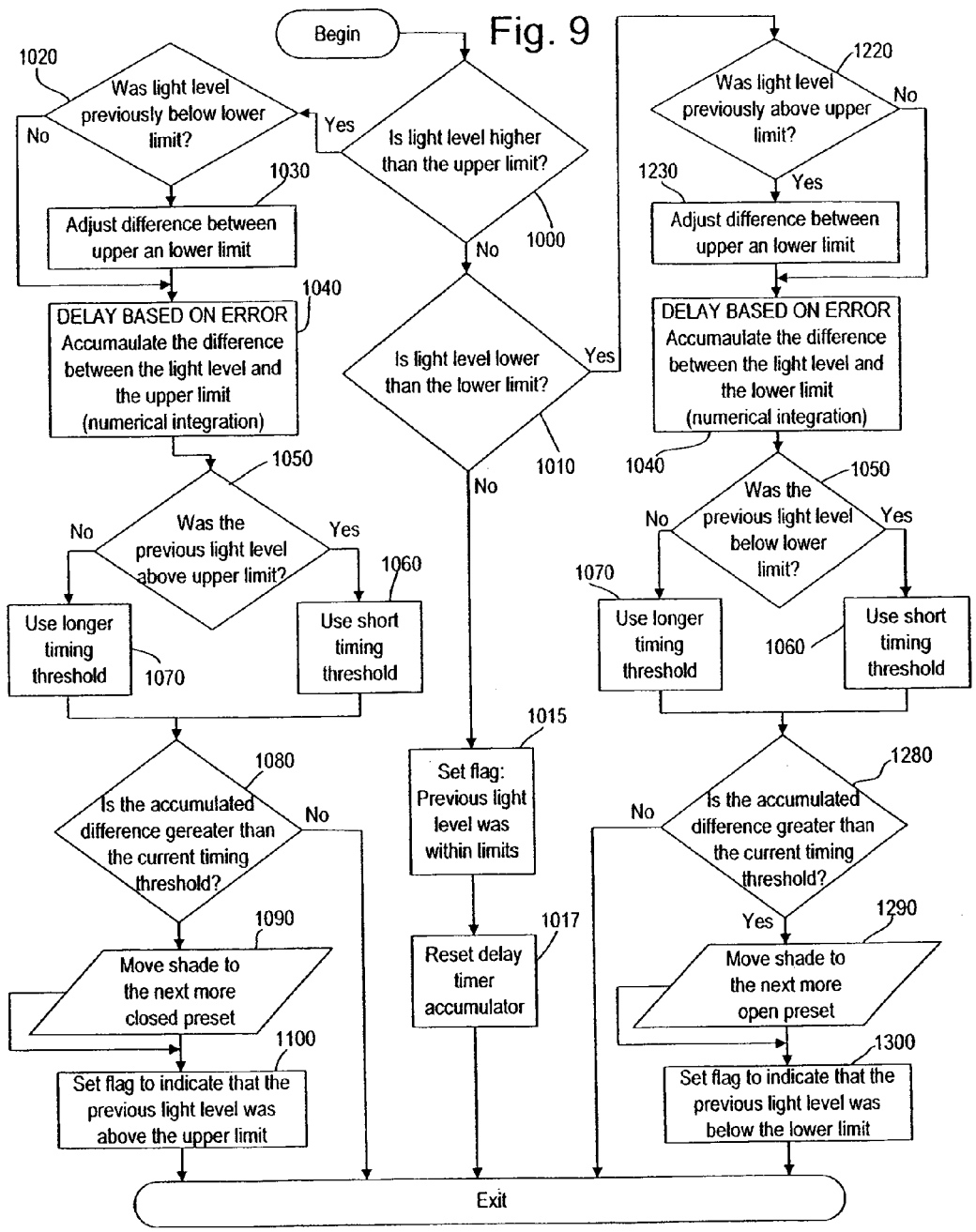
FIG. 9 is the process flow of the system showing how the system varies a time delay to operate the window treatments in response to the amount of illumination.

In order to address the above variable timing, i.e., delaying window treatment changes for temporary conditions while responding to severe glare conditions quickly, the system employs a low sampling rate numerical integration of the light level error. When the incident light level seen by the photosensors 145 is out of the range defined as the dead-band, the difference between the upper or lower limit of the band and the actual light level is numerically accumulated. As shown in FIG. 9, at 1000 and 1010, the light level is checked to determine if it is higher than the upper limit or lower than the lower limit and thus outside of the dead-band. If it is within the dead-band (1015), a delay timer accumulator is reset (1017) and an exit made. If the light level is higher than the upper limit, control is to 1020; if it is lower than the lower limit, control is to 1220. In either case, when the light level is outside the dead band, the actual light level is numerically accumulated as shown at 1040 and at 1240. When the accumulated sum exceeds predefined limits, the window treatments are moved in order to bring the light level within the dead-band. The actual timing thresholds are different depending on the sign of the error. As mentioned above, the response time for the high illumination condition is shorter than the response time for the low illumination condition. Time delays are reduced in case of consistently low or consistently high sunlight illumination.

In more detail, if the light level is higher than the upper limit of the dead-band, at 1020 the previous light level is compared to the lower limit to determine if it was previously below the lower limit. In such case, the difference between the upper and lower limits is adjusted at 1030 to reset the lower limit. If the light level was not previously below the lower limit, or after the adjustment at 1030, the difference between the light level and the upper limit is accumulated, thereby resulting in a delay (1040).

At 1050, the previous light level is compared to the upper limit. If the previous light level was also above the upper limit, a shorter timing threshold 1060 is employed. This indicates a persistent high light level condition. If the previous light level was not above the upper limit, a longer timing threshold 1070 is employed. As stated above, the time delays are reduced in the case of consistently high sunlight illumination. At 1080, the accumulated difference between the light level and the upper limit is checked to determine if it is greater than the current timing threshold set at 1060 or 1070. When the accumulated difference exceeds the timing threshold, the shade is moved to the next more closed preset as indicated at 1090. At 1100, a flag is set to indicate that the previous light level was above the upper limit as determined at step 1050, for the next cycle.

If the light level was lower than the lower limit as indicated at 1010, a similar process flow 1220, 1230, 1240, 1250, 1260, 1270, 1280, 1290 and 1300 is employed. However, in this process flow the accumulated difference is between the light level and the lower limit. Similarly, a shorter timing threshold is used if the previous light level was below the lower limit (consistently low sunlight illumination). As discussed above, the response time for consistently high or low illumination conditions is reduced. Time delays are reduced in the case of consistently low or consistently high sunlight illumination. This is indicated at 1060 for the consistently high sunlight condition and at 1260 for the consistently low sunlight condition.

In order to correctly address the glare control problem, the window treatment control process flow employs a variable control setpoint or threshold. When the sun angle is low, the sunlight intensity drops but the likelihood of a glare incident increases. This is because the sunrays become nearly horizontal and can easily directly penetrate deeply into interior spaces. Spaces with windows facing directly east or west are especially susceptible to this problem since they get a direct sun exposure at very low sun angles, at sunrise and sunset, respectively.

The reduction of sun intensity early and late in the day can be expressed as a sinusoidal function of the sun angle above horizon multiplied by the atmospheric attenuation factor.

As is well known to those experienced in the art, based on the fact that the sun is substantially a point source, the sun illumination is $Ev=dF/dA=I*\cos \gamma/r^2$.

Where:

$\gamma$ is the sun angle in respect to direction perpendicular to the surface;

I is luminous intensity;

r is distance from the source;

F is luminous flux;

A is area.

Based on simple trigonometry it can be determined that the sun illumination on a horizontal task surface is a sinusoidal function of the sun angle above the horizon. The atmospheric attenuation factor varies with pollution and moisture content of the air and these factors also affect the extent of perceived glare but can be neglected when determining how much the set point needs to be varied. Based on experiments, it can be concluded that variation of the control set point based on the sun angle alone produces satisfactory glare control performance. The central processor 100 features an astronomic time clock so the sunrise and sunset times are available. The window treatment process flow set point is therefore varied indirectly based on the astronomic time clock readings. In an average commercial building the correction is only required during a limited interval of time approximately three hours after sunrise and three hours before sunset. A set point correction factor based on the sinusoidal function of the predicted sun angle gives good practical results. The correction factor can also be implemented in a digital system based on a lookup table directly from the astronomic time clock reading.

For small sun angles, a linear approximation of the sinusoidal function can be applied, that is, since $\sin \alpha \sim \alpha$, where angle $\alpha$ measured between the earth's surface and the sun's inclination above the surface.

According to the invention, two alternative methods for calculation of set point correction to control interior illumination and glare are described below. The symbols used are:

LSCF=low sun angle correction factor;

CTM=current time in minutes;

TSSTM=today's sunset time in minutes;

TSRTM=today's sunrise time in minutes;

CI=predefined correction interval after sunrise and before sunset expressed in minutes (CI is typically 120–180 min depending on the window height and proximity of furniture to windows);

NTSR=night time photosensor reading resulting from electric lights only;

NTUT=night time upper threshold derived from night time sensor reading (value influenced by electric lighting only)—by default this can be set to 20% above the NTSR;

NTLT=night time lower threshold—preferred value is 10% above NTSR to ensure that window treatments remain open after sunset. Lower values may be selected, for instance, to ensure that the window treatments remain closed after sunset for privacy;

CUTHR=sun angle corrected upper threshold of the dead-band;

CLTHR=sun angle corrected lower threshold of the dead-band set point;

DTUT=upper threshold set point;

DTLT=lower threshold set point;

TARGET=target set point (preferably half way between LTHR and UTHR);

PSR=actual photosensor reading;

CPRS=corrected photosensor reading.

The following algorithm was successfully applied:

If (current time is within the predefined correction interval CI before sunset)

LSCF=(TSSTM−CTM)/CI

Else if (current time is within the predefined correction interval CI after sunrise)

LSCF=(CTM−TSRTM)/CI

Else

LSCF=1

CUTHR=(DTUT−NTUT)*LSCF+NTUT

CLTHR=(DTLT−NTLT)*LSCF+NTLT

Alternatively the sensor (Photosensor) gain can be changed based on astronomic time clock readings to achieve an effect equivalent to lowering the thresholds:

If (current time is within the correction interval before sunset)

LSCF=(TSSTM−CTM)/CI

Else if (current time is within the correction interval after sunrise)

LSCF=(CTM−TSRTM)/CI

Else

LSCF=1

CPSR=PSR*DTUT/((DTUT−NTUT)*LSCF+NTUT)

Figure 14:
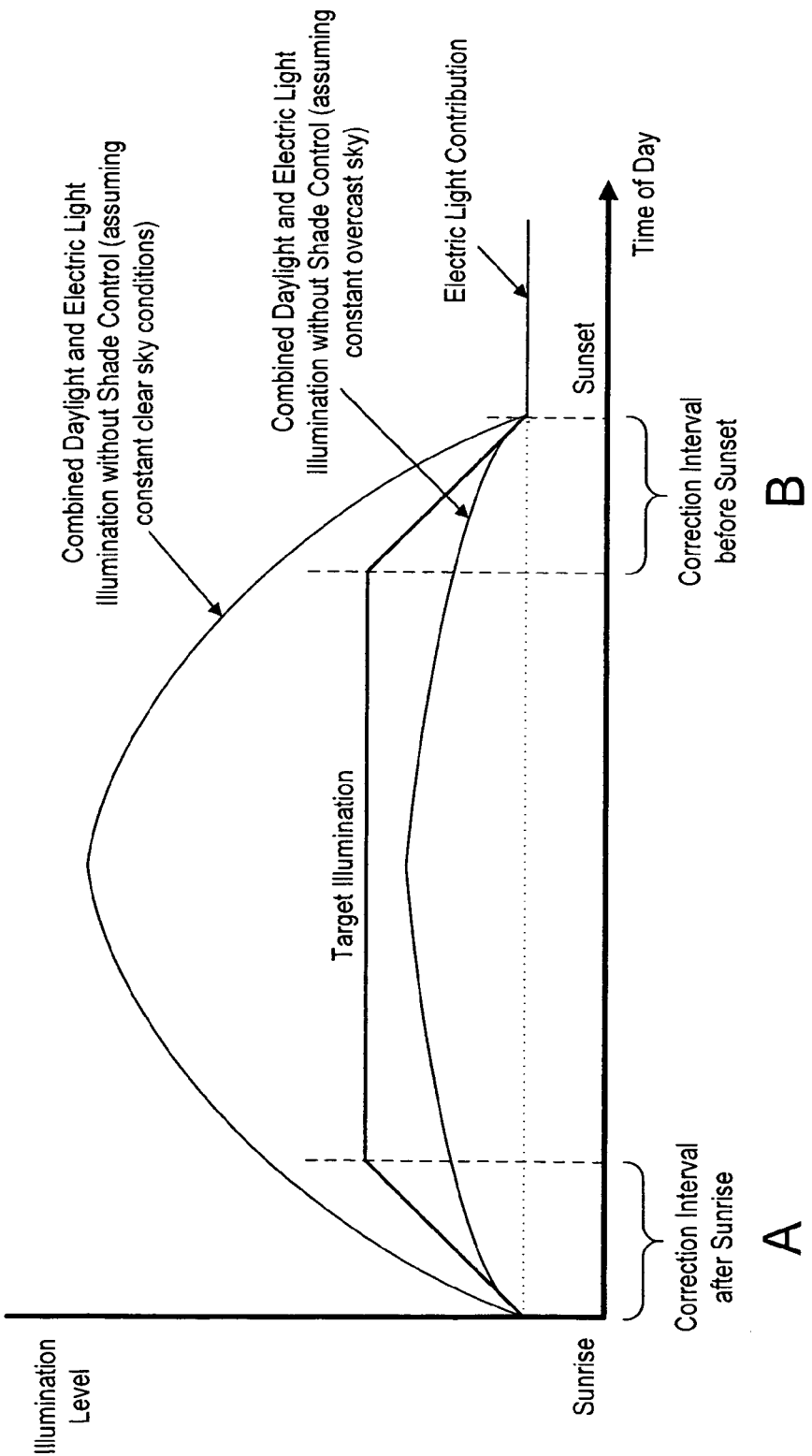
FIG. 14 shows graphs of illumination levels and when glare control is needed throughout a day.

Based on the above, it can be seen that during the correction interval after sunrise and before sunset, a linear approximation of the sun correction factor is made by dividing the time difference (in minutes) between sunrise (or sunset) and the current time during the correction interval by the correction interval. This results in a good approximation of the correction factor. This is illustrated in FIG. 14, which shows the two glare control intervals A (sunrise) and B (sunset). It can be seen that the target illumination is bounded by lines having slopes. The instantaneous value of these lines represents the correction factor at a particular time during the glare control intervals. Note that for the preferred embodiment, a correction interval of 180 minutes is used.

The default set point (before correction) is manually set during calibration based on the desired illumination in the space in front of the windows. Therefore the functions of illumination maintenance and glare control can be integrated in a single control algorithm. These variable target illumination values are preferably set such that they are, during the likely glare interval, below the sinusoidal curve representing the vertical daylight illumination variation on a clear day and above the sinusoidal curve representing the variation of vertical illumination on a cloudy day. This allows the algorithm to differentiate between the clear sky condition and the overcast condition.

Based on the astronomical timeclock, the system at night time automatically detects and updates the component of the photosensor 145 reading caused only by the electric lighting. This component is preferably further subtracted from the daytime reading of the light sensor to determine the component of the sensor signal caused only by daylight.

Two alternative ways to correct for the decrease of illumination with the sun angle which have essentially the same effect are thus described above. As discussed, since the incident illumination drops with the sun angle either the dead-band thresholds can be reduced for low sun angles above the horizon or alternatively the photosensor gain can be increased and the midday dead-band thresholds maintained throughout the day.

Figure 10:
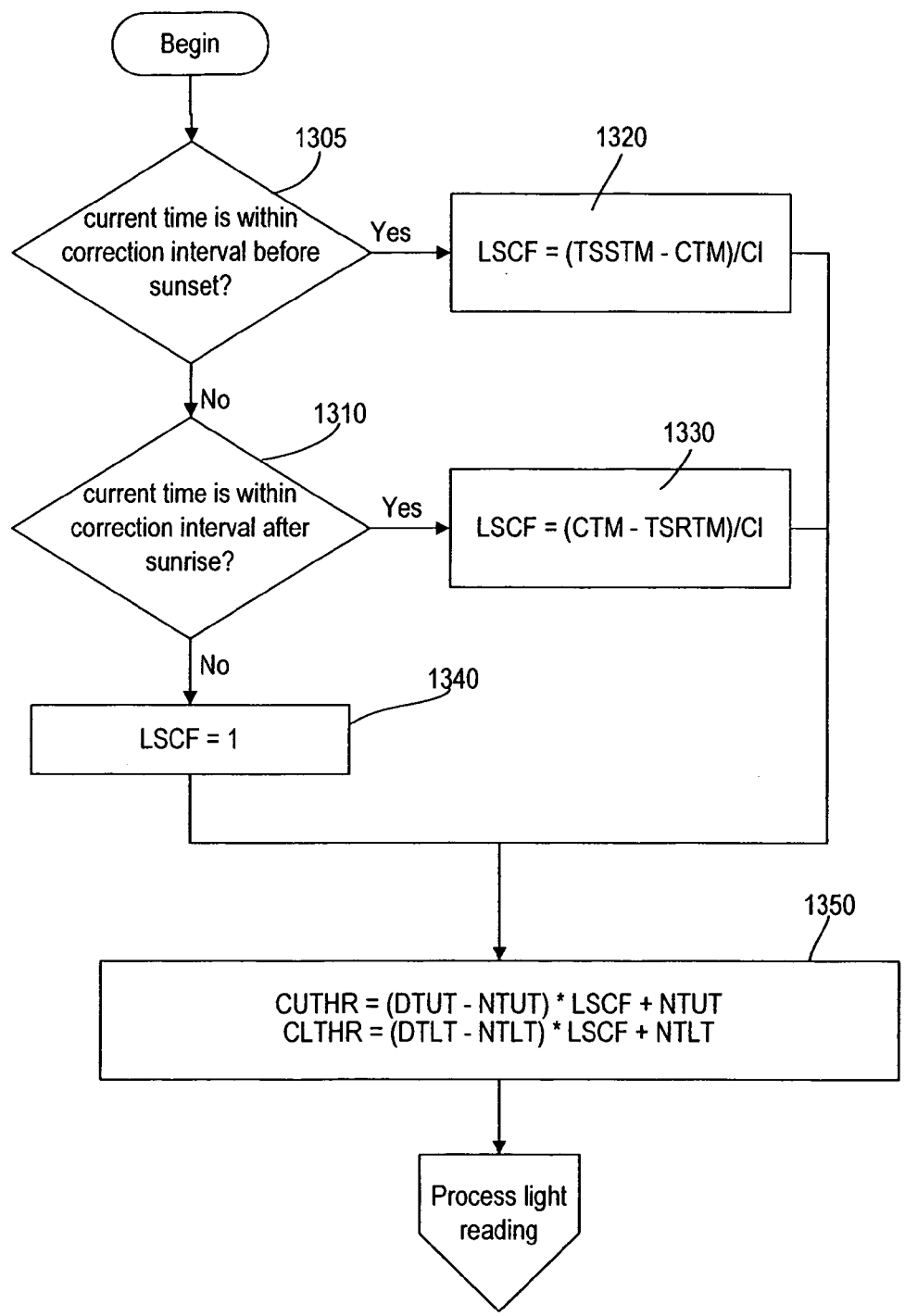
FIG. 10 shows how the system varies the dead-band set point to reduce glare.
Figure 11:
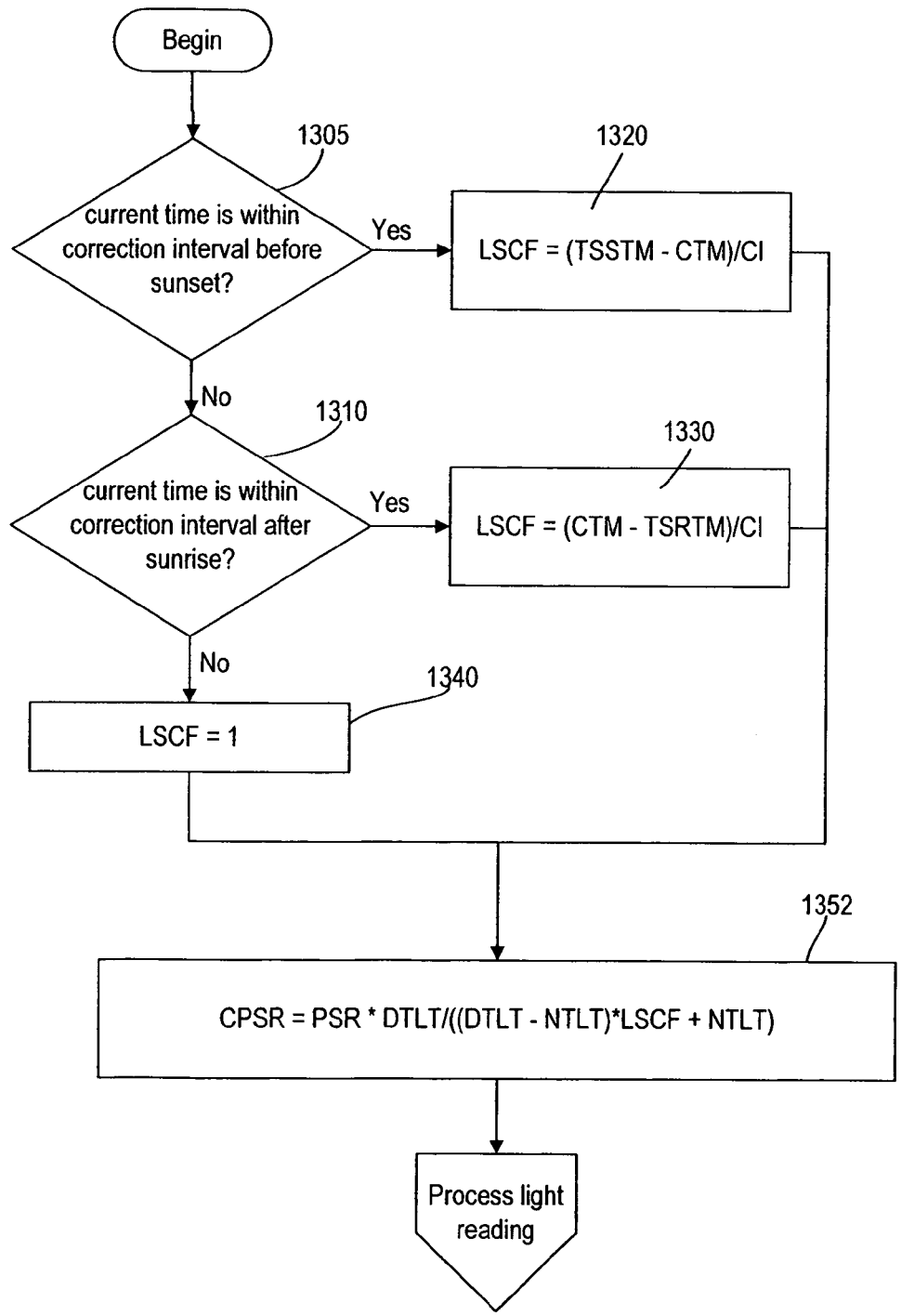
FIG. 11 shows an alternative process flow for reducing sun glare.

FIGS. 10 and 11 show the process flow for the above sun angle correction algorithms. FIG. 10 shows one embodiment and FIG. 11 shows the above described alternative embodiment. Turning to FIG. 10, this figure shows how the system varies the dead-band set point or threshold in order to reduce glare, as described above. If the current time, as determined by the astronomical time clock is either within the correction interval before sunset (1300) or after sunrise (1310), the low sun correction function is adjusted at 1320, 1330. If the time is not within the correction interval, the correction factor is set at 1 (1340). At 1350 the dead-band thresholds are corrected by the correction factor. The light levels are then processed based on the new dead-band thresholds.

FIG. 11 shows the alternative embodiment where the photosensor gain is increased. It is identical to the flow of FIG. 10, except step 1352 is substituted for step 1350 of FIG. 11. At step 1352, the photosensor light reading value is divided by the correction factor to increase the photosensor value and the light reading, as corrected, is processed. Accordingly, in FIG. 10, the dead-band thresholds are adjusted and in FIG. 11, the potosensor readings are adjusted (by increasing them).

Since the window treatments must also be able to be controlled manually, the system must be able to account for manual overrides, i.e., when a user manually adjusts the window treatment. A manual override introduces a serious problem in a closed loop window treatment control system. Once the manual control command is executed, the interior illumination may exceed the range defined by the dead-band of the control process flow and the system would automatically cancel the override. This obviously is undesirable. To address this problem, the process flow readjusts the control set point after an override. Once the window treatments have stopped moving after a manual override, the process flow temporarily adjusts the control set point to match the currently measured interior light level. The newly established light level is also preferably copied into another variable used to establish the long term preferences of the occupants. During the low sun angle correction interval, previously described, the temporary override set point thresholds are corrected in exactly the same way as in the case where no manual override has been applied.

The temporary control set point can be canceled either based on the daylight exceeding the bounds of the predefined dead-band established by the temporary set point or based on a predefined time delay after an override or both. Once the override is canceled, the control system reverts to the default set point.

The system can optionally adjust the default set point based on repeated occupant input. As stated above, each time an occupant performs a manual override, the newly established light level when the window treatments stop moving is further processed. The processing can be based on averaging the override light level either continuously or based on the time of day for instance only during the time interval when the sun glare is likely to occur. Once the long term average tendency is identified, the system can make an adjustment of the default control set point to the usual or most likely user override.

Figure 12:
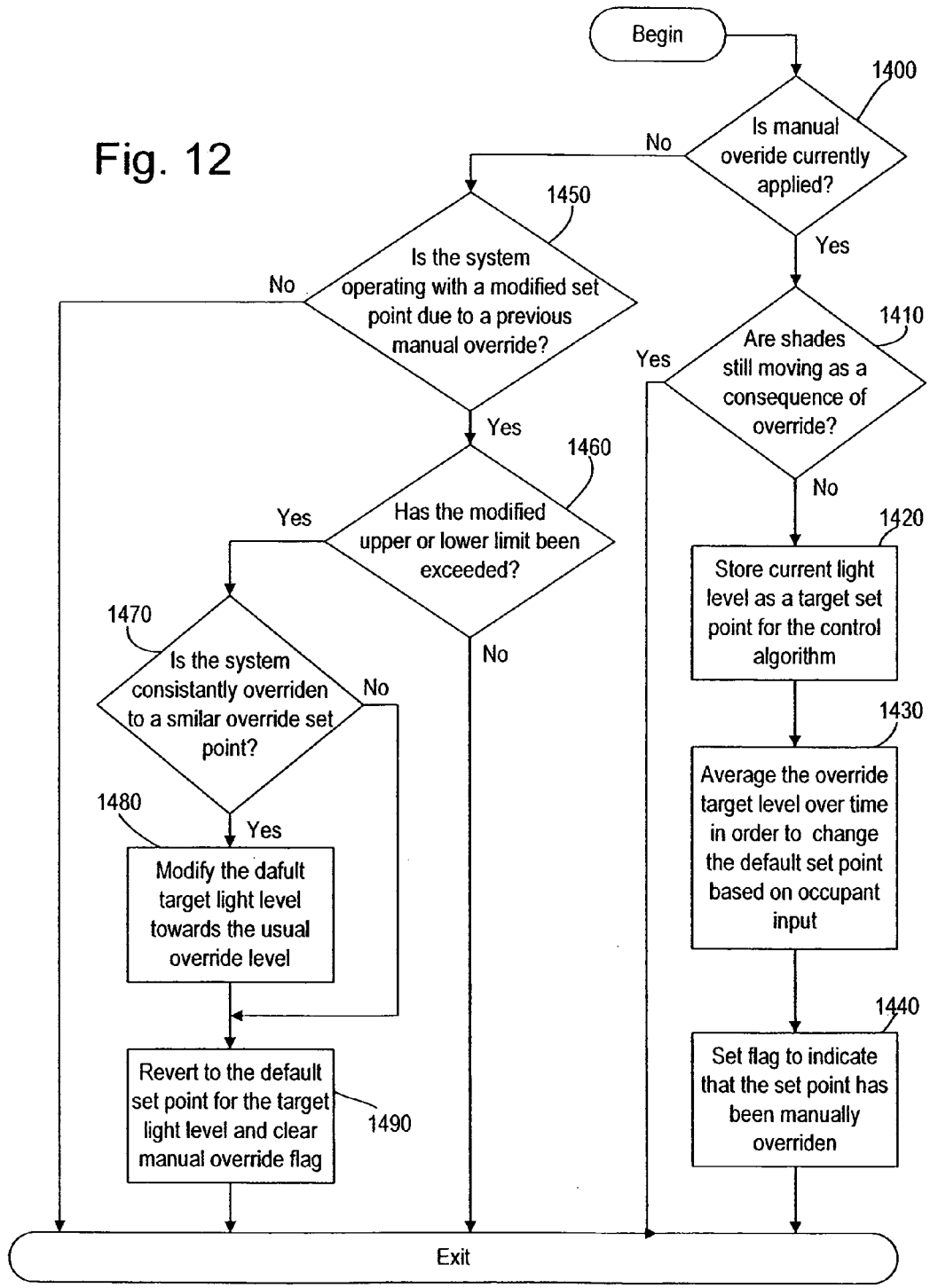
FIG. 12 shows the process flow in response to a manual override.

FIG. 12 shows the process flow in the event of an override. At 1400 the system checks to determine if a manual override is currently applied. If so, at 1410 the system determines whether the shades are still moving as a consequence of the override. If yes, the system exits to return to the main loop. Once the shades stop moving, the system stores the current light level as a target set point for the control process at step 1420. At 1430, the system averages the override target level over time in order to change the default set point based on occupant input and at 1440 sets the flag to indicate that the setpoint has been manually overridden.

If a manual override is not currently applied, as determined at 1400, the system checks at 1450 to determine if it is operating with a modified setpoint due to a previous manual override. If yes, the system checks at 1460 to determine if the modified upper or lower limit has been exceeded. If no, the system exits to the main loop. If yes, at 1470 the system determines if it is consistently overridden through a similar override set point. If yes, the system at 1480 modifies the default target light level toward the consistently used override level. If the system is not consistently overridden or after the modification at step 1480, the system reverts at 1490 to the default setpoint for the target light level, clears the manual override flag and exits to the main loop.

Figure 13A:
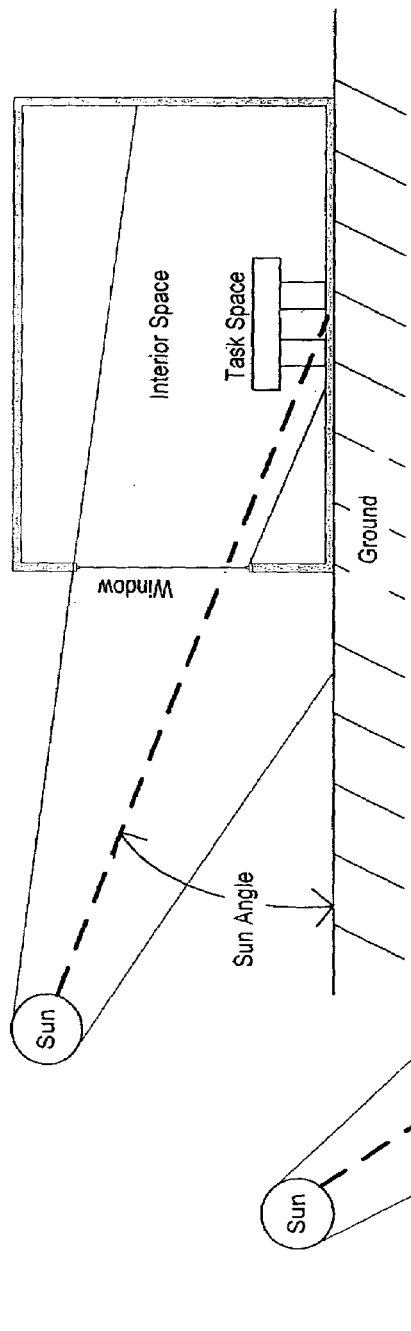
FIGS. 13a and 13b, shows how sun angle is measured.
Figure 13B:
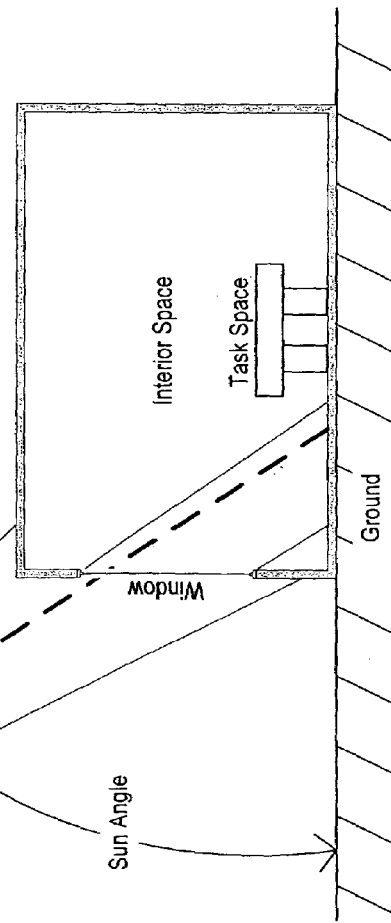

FIGS. 13*a* and 13*b* shows the relationship between the sun angle and the direct sun penetration into the space. FIG. 13*a* shows how at low sun angles the direct sun rays penetrate deeper into the space and affect the task surface basically representing a glare condition. FIG. 13*b* shows the absence of direct incident sun rays on the task surface associated with larger sun angles.

FIG. 14 graphically shows the daylight illumination variation of the vertical daylight illumination throughout a day for two conditions (clear and overcast), the variation of target illumination and the time intervals A and B when glare control is needed and where the target illumination is corrected to account for the reduction of illumination caused by the sun angle above the horizon.

Accordingly, the system described provides for the maintenance of optimal light levels in a space based upon optimal use of both daylight and artificial lighting provided by electric lamps. In addition, the system preferably automatically detects and reduces sun glare when sun glare presents a problem.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An illumination maintenance system for maintaining a desired illumination profile in a space throughout at least a portion of a day where the illumination sources include daylight and artificial light, the system comprising:
   a first sensor for sensing an illumination level in at least a portion of the space;
   at least one electrically controllable window treatment for at least one opening for allowing daylight into the space, the window treatment selectively altering the amount of daylight entering the space through the opening;
   a plurality of electric lamps providing artificial light to supplement the daylight illumination of the space, the electric lamps being dimmable and being arranged in one or more zones in the space, the zones defining predefined volumes of the space, each zone having at least one lamp;
   a control system controlling the at least one window treatment and the plurality of electric lamps to maintain the desired illumination profile in the space, the at least one lamp of each zone being controllable to a dimming level to achieve a desired illumination level in the respective zone according to the desired illumination profile;
   the control system controlling the plurality of electric lamps so that the dimming level of each lamp is adjusted to achieve the desired illumination profile and compensate for the daylight illumination in the space throughout at least the portion of the day; and
   the control system further operating to adjust the at least one window treatment in the event of sun glare through the opening to reduce the sun glare;
   wherein the dimming level of each lamp is selected by the control system from one of a plurality of lighting presets, each preset comprising a predetermined combination of dimming levels of the at least one lamp in each zone and wherein the control system adjusts the dimming level of the electric lamps toward a lighting preset that will result in an appropriate supplementing of the daylight illumination to achieve the desired illumination profile in the space; and
   the control system operating such that when the desired illumination profile within a predefined tolerance is achieved, the control system stops varying the dimming levels of the lamps and the adjustment of the window treatment.

2. The system of claim 1, wherein the dimming level of each lamp is selected by the control system from one of a plurality of lighting presets, each preset comprising a combination of dimming levels of the lamps and the control system selects a preset that will result in an appropriate supplementing of the daylight illumination to achieve the desired illumination profile in the space.

3. The system of claim 1, further comprising at least one second sensor for sensing daylight illumination entering the space and providing an input to the control system to control the at least one window treatment.

4. The system of claim 3, wherein the at least one second sensor provides an input to the control system to control the at least one window treatment to reduce sun glare.

5. The system of claim 1, wherein the at least one first sensor provides an input to the control system to control the at least one window treatment and the plurality of electric lamps.

6. The system of claim 1, further comprising a plurality of first sensors for sensing the illumination level in the space.

7. The system of claim 6, wherein a combined output level of the first sensors is determined by averaging outputs of the plurality of first sensors.

8. The system of claim 6, wherein the control system employs a dead-band having upper and lower set points such that if the sensed illumination in the space is outside the dead-band, the window treatment is adjusted to bring the illumination level in the space within the dead-band.

9. The system of claim 8, wherein the control system employs a time delay before moving the window treatment to bring the illumination level in the space back within the dead-band.

10. The system of claim 9, wherein the time delay to bring the illumination level in the space back within the dead-band is shorter for high illumination levels than for low illumination levels.

11. The system of claim 10, wherein the timing delay is reduced if daylight illumination is consistently high or consistently low.

12. The system of claim 8, wherein during a time period when glare from the sun through the opening can occur, at least one set point of the dead-band can be varied to reduce glare.

13. The system of claim 12, wherein a set point is variable during a time period determined by an estimated angle of the sun.

14. The system of claim 13, wherein the set point is reduced during the time period when glare from the sun through the opening can occur.

15. The system of claim 13, wherein the set point is variable during periods approximately two hours after sunrise and two hours before sunset.

16. The system of claim 13, wherein the control system includes an astronomical time clock and the set point is calculated in response to the time determined by the time clock.

17. The system of claim 8, wherein a user can manually adjust the window treatment, and further wherein at least one of the set points is temporarily adjusted after a manual adjustment to match the light level measured after the manual adjustment.

18. The system of claim 17, wherein the control system reverts to a default set point after the light level exceeds a predefined dead-band around the temporary set point set after a manual adjustment.

19. The system of claim 18, wherein the default set point is adjusted automatically after the control system detects a repeated manual adjustment of the window treatment.

20. The system of claim 1, wherein the control system adjusts the window treatment to maximize the amount of daylight entering the space when the illumination level detected by said first sensor is too low.

21. The system of claim 1, wherein the control system adjusts the window treatment to minimize the amount of daylight entering the space when the illumination level detected by said first sensor is too high.

22. The system of claim 1, wherein the control system compares the illumination level in the space to first and second thresholds, the first threshold corresponding to a light level that is too dark and the second threshold corresponding to a light level that is too high.

23. The system of claim 22, further wherein the control system has a main control loop in which the illumination level is compared to the first and second thresholds and a first subloop to select an appropriate dimming level of the plurality of electric lamps when the light level is too dark and a second subloop to select an appropriate dimming level of the plurality of electric lamps when the light level is too high.

24. The system of claim 23, wherein the control system determines in the main control loop if the light level is acceptable.

25. The system of claim 23, wherein the dimming levels comprise a plurality of preset dimming levels.

26. The system of claim 1, wherein the control system adjusts the sensitivity of the first sensor to compensate for the first sensor's differing sensitivity to different light sources.

27. The system of claim 1, wherein the sensor has a gain factor, and the control system adjusts the gain factor during the time period when glare from the sun through the opening can occur.

28. The system of claim 1, wherein the control system includes an astronomical time clock, and wherein the time of day data provided by the time clock is used to correct a spectral sensitivity property of the sensor.

29. A method for maintaining a desired illumination profile in a space throughout at least a portion of a day where the illumination sources include daylight and artificial light, the method comprising:

sensing an illumination level in at least a portion of the space;

providing at least one electrically controllable window treatment for at least one opening for allowing daylight into the space, the window treatment selectively altering the amount of daylight entering the space through the opening;

supplementing the daylight illumination of the space with a plurality of electric lamps providing artificial light, the electric lamps being dimmable and being arranged in one or more zones in the space, the zones defining predefined volumes of the space, each zone having at least one lamp;

controlling with a control system responsive to the sensed illumination level the at least one window treatment and the plurality of electric lamps to maintain the desired illumination profile in the space, the step of controlling comprising adjusting the dimming level of the at least one lamp of each zone to achieve a desired illumination level in the respective zone according to the desired illumination profile and thereby maintain the desired illumination profile in the space and compensate for the daylight illumination in the space;

controlling with the control system the plurality of electric lamps so that the dimming level of each lamp is adjusted to achieve the desired illumination profile and compensate for the daylight illumination in the space throughout at least the portion of the day;

further adjusting with the control system the at least one window treatment in the event of sun glare through the opening to reduce the sun glare;

wherein the dimming level of each lamp is selected by the control system from one of a plurality of lighting presets, each preset comprising a predetermined combination of dimming levels of at least one lamp in each zone and wherein the control system adjusts the dimming level of the electric lamps toward a lighting preset that will result in an appropriate supplementing of the daylight illumination to achieve the desired illumination profile in the space;

stopping varying of the dimming levels of the lamps and the adjustment of the window treatment when the desired illumination profile within a predefined tolerance is achieved; and repeating the above steps during the day to maintain the desired illumination profile throughout at least the portion of the day.

30. An illumination maintenance system for maintaining a desired illumination profile in a space throughout at least a portion of a day where the illumination sources include daylight and artificial light, the system comprising:

at least one interior sensor for sensing an illumination level in at least a portion of the space;

at least one electrically controllable window treatment for at least one opening for allowing daylight into the space, the window treatment selectively altering the amount of daylight entering the space through the opening;

a plurality of electric lamps providing artificial light to supplement the daylight illumination of the space, the electric lamps being dimmable;

a control system controlling the at least one window treatment and the plurality of electric lamps to maintain the desired illumination profile in the space;

the control system controlling the plurality of electric lamps so that the dimming level of each lamp is adjusted to achieve the desired illumination profile and compensate for the daylight illumination in the space throughout at least a portion of the day;

wherein the control of the electric lamps is implemented based on an open loop control algorithm and the control of the at least one window treatment is implemented based on a closed loop control algorithm; and wherein the control of both the electric lamps and the at least one window treatment is based on a signal representing a single input variable derived from the at least one interior sensor.

31. The control system of claim 30 wherein the at least one interior sensor is replaced by a plurality of interior sensors whose output signals are processed by the control algorithms as a single input variable.

* * * * *